(12) United States Patent
Kirchhoffer et al.

(10) Patent No.: US 9,344,744 B2
(45) Date of Patent: May 17, 2016

(54) APPARATUS FOR INTRA PREDICTING A BLOCK, APPARATUS FOR RECONSTRUCTING A BLOCK OF A PICTURE, APPARATUS FOR RECONSTRUCTING A BLOCK OF A PICTURE BY INTRA PREDICTION

(71) Applicant: Fraunhofer-Gesellschaft zur Foerderung der angewandten Forschung e.V., Munich (DE)

(72) Inventors: Heiner Kirchhoffer, Berlin (DE); Detlev Marpe, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 813 days.

(21) Appl. No.: 13/649,258

(22) Filed: Oct. 11, 2012

(65) Prior Publication Data
US 2013/0034158 A1 Feb. 7, 2013

Related U.S. Application Data

(63) Continuation of application No. PCT/EP2010/054836, filed on Apr. 13, 2010.

(51) Int. Cl.
*H04N 7/32* (2006.01)
*H04N 19/82* (2014.01)
(Continued)

(52) U.S. Cl.
CPC ............... *H04N 19/82* (2014.11); *H04N 19/11* (2014.11); *H04N 19/117* (2014.11);
(Continued)

(58) Field of Classification Search
None
See application file for complete search history.

(56) References Cited

U.S. PATENT DOCUMENTS

2002/0176504 A1* 11/2002 Zaccarin ................ H04N 19/30
375/240.16
2004/0136458 A1 7/2004 Dahlhoff et al.
(Continued)

FOREIGN PATENT DOCUMENTS

EP 2003897 12/2008
JP EP 2003897 A2 * 12/2008 ....... H04N 21/23892
(Continued)

OTHER PUBLICATIONS

Chujoh, Takeshi et al., "Internal Bit Depth Increase for Coding Efficiency", ITU—Telecommunications Standardization Sector, Study Group 16, Question 6, Video Coding Experts Group (VCEG), 31st Meeting: Marrakech, MA, Jan. 15-16, 2007, Jan. 2007, pp. 1-6.
(Continued)

*Primary Examiner* — Christopher S Kelley
*Assistant Examiner* — Kaitlin A Retallick
(74) *Attorney, Agent, or Firm* — Perkins Coie LLP; Michael A. Glenn

(57) ABSTRACT

An apparatus for intra predicting a block to be predicted of a picture from neighboring image samples sequentially extending along two rays starting at a common intersection point and pointing into different directions, the neighboring image samples including edge neighboring samples bordering the block to be predicted, includes a smoothing filter and a determiner. The smoothing filter is configured to one-dimensionally filter the neighboring image samples, which are sequentially arranged into a sequence by anti-parallelly traveling along a first one of the two rays and parallelly traveling along a second one of the two rays to obtain a filtered image sample sequence. The determiner is configured to determine a prediction value for a predetermined image sample of the block to be predicted by using the filtered image sample sequence.

12 Claims, 10 Drawing Sheets

(51) Int. Cl.
*H04N 19/159* (2014.01)
*H04N 19/176* (2014.01)
*H04N 19/61* (2014.01)
*H04N 19/593* (2014.01)
*H04N 19/11* (2014.01)
*H04N 19/117* (2014.01)
*H04N 19/184* (2014.01)

(52) U.S. Cl.
CPC .......... *H04N 19/159* (2014.11); *H04N 19/176* (2014.11); *H04N 19/184* (2014.11); *H04N 19/593* (2014.11); *H04N 19/61* (2014.11)

(56) References Cited

U.S. PATENT DOCUMENTS

| | | | | |
|---|---|---|---|---|
| 2005/0259729 | A1* | 11/2005 | Sun | H04N 19/36 375/240.1 |
| 2006/0088106 | A1* | 4/2006 | Winger | H04N 19/105 375/240.24 |
| 2008/0002767 | A1* | 1/2008 | Schwarz | H04N 19/147 375/240.12 |
| 2009/0225869 | A1* | 9/2009 | Cho | H04N 19/105 375/240.26 |
| 2009/0317008 | A1* | 12/2009 | Cho | H04N 19/13 382/238 |
| 2010/0014765 | A1* | 1/2010 | Kotaka | H04N 19/176 382/236 |
| 2010/0020866 | A1* | 1/2010 | Marpe | H04N 19/00569 375/240.02 |
| 2010/0226434 | A1* | 9/2010 | Lee | H04N 19/46 375/240.16 |

FOREIGN PATENT DOCUMENTS

| | | |
|---|---|---|
| WO | WO-2004064397 | 7/2004 |
| WO | WO-2006017230 | 2/2006 |
| WO | WO-2008049446 | 5/2008 |
| WO | WO-2008130367 | 10/2008 |
| WO | WO-2009151615 | 12/2009 |

OTHER PUBLICATIONS

Hsia, Shih-Chang et al., "A Configurable IP for Mode Decision on H.264/AVC Encoder", IEEE, 2nd NASA/ESA Conference on Adaptive Hardware and Systems, AHS 2007, 2007, 8 pp.

Ye, Yan et al., "High Precision Interpolation and Prediction", ITU—Telecommunications Standardization Sector, Study Group 16, Question 6, Video Coding Experts Group (VCEG), 35th Meeting: Berlin, Germany, Jul. 16-18, 2008, Jul. 2008, pp. 1-4.

Wiegand, Thomas et al., "Overview of the H.264/AVC Video Coding Standard", IEEE Transaction on Circuit and Systems for Video Technology, vol. 13, No. 7, Jul. 2003, 560-576.

\* cited by examiner

FIG 5

| mode index | mode name | type | slope r | interpolation filter | reference ray to predict from |
|---|---|---|---|---|---|
| 0 | North | Directional | ∞ | FP: [1]<br>HP: - | - |
| 1 | West | Directional | 0 | FP: [1]<br>HP: - | - |
| 2 | DC | DC | - | - | - |
| 3 | Northeast | Directional | 1 | FP: [1/4 1/2 1/4]<br>HP: [1/2 1/2] | Top ray |
| 4 | Northwest | Directional | -1 | FP: [1/4 1/2 1/4]<br>HP: [1/2 1/2] | - |
| 5 | North-northwest | Directional | -2 | FP: [1/4 1/2 1/4]<br>HP: [1/2 1/2] | - |
| 6 | West-northwest | Directional | -1/2 | FP: [1/4 1/2 1/4]<br>HP: [1/2 1/2] | - |
| 7 | North-northeast | Directional | 2 | FP: [1/4 1/2 1/4]<br>HP: [1/2 1/2] | Top ray |
| 8 | West-southwest | Directional | 1/2 | FP: [1/4 1/2 1/4]<br>HP: [1/2 1/2] | Left ray |

APPARATUS FOR INTRA PREDICTING A BLOCK, APPARATUS FOR RECONSTRUCTING A BLOCK OF A PICTURE, APPARATUS FOR RECONSTRUCTING A BLOCK OF A PICTURE BY INTRA PREDICTION

CROSS-REFERENCE TO RELATED APPLICATIONS

This application is a continuation of copending International Application No. PCT/EP2010/054836, filed Apr. 13, 2010, which is incorporated herein by reference in its entirety.

Embodiments of the present invention relate to an apparatus for intra predicting a block of a picture. Further embodiments of the present invention relate to an apparatus for reconstructing a block of a picture by prediction. Further embodiments of the present invention relate to an apparatus for reconstructing a block of a picture by intra prediction. Embodiments of the present invention my be applicable in decoders and/or encoders, which are used in video coding.

BACKGROUND OF THE INVENTION

In the video coding of conventional-technology, the components of a video frame are predicted either by motion compensated prediction, using the reconstructed color components of previous pictures, or by intra prediction, using previously reconstructed blocks of the same picture (see, for example, Thomas Wiegand, Gary J. Sullivan, Gisle Bjontegaard, and Ajay Luthra: Overview of the H.264/AVC Video Coding Standard, IEEE Tran. on Circuits and Systems for Video Technology, Vol. 13, No. 7, pp. 560-576, July 2003). The residual signal, i.e. the difference between the original color components and the corresponding prediction signals, is usually coded using transform coding (a combination of a decorrelating transform, quantization of transform coefficients, and entropy coding of the resulting quantization symbols). When the picture is comprised of multiple color components (planes), the prediction can either be done separately or can be grouped by sharing the prediction information (plane grouping). Motion compensated prediction can be done for some sub-regions of a picture (see, for example, Thomas Wiegand, Markus Flierl, and Bernd Girod: Entropy-Constrained Design of Quadtree Video Coding Schemes, Proc. 6th IEE Intern. Conf. on Image Processing and its Applications, Dublin, Ireland, July 1997.2). Usually, the sub-regions are rectangular blocks of samples. But it is also conceptually possible to use the same motion parameters for an arbitrary set of samples. The motion parameters are included in the bitstream and transmitted to the decoder. It is possible to use arbitrary motion models. Commonly, the motion is modeled using a translational motion model, in which case a motion vector (2 parameters) specifying a displacement is transmitted for each region. Other common motion models include the affine motion model (6 parameters), 3-, 4-, and 8-parameter models. The motion parameters can be transmitted with arbitrary accuracy. For example, for the translational motion model, the motion vectors could be coded using full-sample accuracy or sub-sample accuracy (e.g. quarter-sample accuracy). In the first case, the prediction samples can be directly copied from the reconstructed pictures. In the case of sub-sample accurate motion vectors (or general motion parameters), the prediction samples are interpolated using the reconstructed samples. The state-of-the-art interpolation methods use FIR filtering. Recently, adaptive FIR filters (see, for example, Thomas Wedi, Adaptive Interpolation Filter for Motion Compensated Hybrid Video Coding, Proc. Picture Coding Symposium (PSC 2001), Seoul, Korea, April 2001) were proposed for improved motion compensated prediction. Any of the previously transmitted pictures can be used for motion compensation (see, for example, Thomas Wiegand, Xiaozheng Zhang, and Bernd Girod: Long-Term Memory Motion-Compensated Prediction, IEEE Transactions on Circuits and Systems for Video Technology, Vol. 9, No. 1, pp. 70-84, February 1999). If the reference picture is not fixed by high-level parameters, reference indices can be transmitted to identify the used reference pictures. It is also possible to modify the prediction signal using a weighting factor and an offset (often referred to as weighted prediction), or any other weighting function to obtain the final prediction signal. Furthermore, several prediction signals can be combined to obtain the final prediction signal. This is often referred to as multi-hypothesis prediction (see, for example, Sullivan, G.; Multi-hypothesis motion compensation for low bit-rate video coding, IEEE International Conference on Acoustics, Speech and Signal Proc. Vol. 5, 1993). The combined prediction signal can, for example, be obtained by a weighted sum of different prediction signals. The individual prediction signals can stem from same or different upsampled reference pictures. If two prediction signals are combined, the multi-hypotheses prediction is also referred to as bi-prediction (as supported in B-slices of modern video coding standards). It is, however, also possible to use more than two hypotheses. The entropy coding of the quantized transform coefficients can be done, for example, by variable-length coding or (adaptive) arithmetic coding (see, for example, Detlev Marpe, Heiko Schwarz, and Thomas Wiegand: Context-Based Adaptive Binary Arithmetic Coding in the H264/AVC Video Compression Standard, IEEE Tran. on Circuits and Systems for Video Technology, Vol. 13, No. 7, pp. 620-636, July 2003).

However, in video coding, there is a desire to improve a compression efficiency of the transmitted information and to reduce a computational load in video coding.

SUMMARY

According to an embodiment, an apparatus for intra predicting a block to be predicted of a picture from neighboring image samples sequentially extending along two rays starting at a common intersection point and pointing into different directions, the neighboring image samples having edge neighboring samples bordering the block to be predicted, may have: a smoothing filter configured to one-dimensionally filter the neighboring image samples sequentially arranged into a sequence by anti-parallelly traveling along a first one of the two rays and parallelly traveling along a second one of the two rays to achieve a filtered image sample sequence; and a determiner configured to determine a prediction value for a predetermined image sample of the block to be predicted by using the filtered image sample sequence.

According to another embodiment, an apparatus for reconstructing a block of a picture defined in a first precision by prediction may have: a reconstructor configured to reconstruct reference image samples from a data stream at a second precision being equal to or greater than the first precision to achieve reconstructed reference image samples; an extractor configured to extract a transform coefficient block from the data stream; a predictor configured to determine predicted image samples for the block from the reconstructed reference image samples at a third precision higher than the second precision; an inverse transformer configured to apply an inverse spectral decomposition transform to the transform coefficient block to achieve reconstructed residual sample values for the block at a fourth precision greater than the first precision; and wherein the reconstructor is further configured to reconstruct the block by summation of the predicted image samples and the reconstructed residual sample values at an increased precision equal to or greater than at least one of the third and fourth precisions and reducing a result of the summation having the increased precision down to the second precision.

According to another embodiment, an apparatus for encoding a block of a picture defined in a first precision may have: a reconstructor configured to reconstruct reference image samples at a second precision being equal to or greater than the first precision to achieve reconstructed reference image samples; a predictor configured to determine predicted image samples for the block from the reconstructed reference image samples at a third precision higher than the second precision; a residual sample value determiner configured to compare the predicted image samples and original image samples of the block of the picture defined in the first precision to determine residual sample values for the block; a transformer configured to apply a spectral decomposition transform to the achieved residual sample values and use a quantization to achieve a transform coefficient block; an inverse transformer configured to apply an inverse spectral decomposition transform to the transform coefficient block to achieve reconstructed residual sample values for the block at a fourth precision greater than the first precision; wherein the reconstructor is further configured to achieve reconstructed image samples of the block by summation of the predicted image samples and the reconstructed residual sample values at an increased precision equal to or greater than at least one of the third and fourth precisions and reducing a result of the summation having the increased precision down to the second precision; and a data stream inserter configured to insert the transform coefficient block into a data stream.

According to another embodiment, an apparatus for reconstructing a block of a picture by intra prediction may have: a reconstructor configured to determine reconstructed values of neighboring image samples of the picture, neighboring the block from a data stream, at a first fixed point precision; an extractor configured to extract an intra-prediction parameter from the data stream; and an intra predictor configured to determine a prediction value for a predetermined image sample of the block from the reconstructed values of the neighboring image samples by performing an interpolation between the reconstructed values of the neighboring image samples at an intersection between a line crossing the predetermined image sample and extending in a predetermined direction selected from a set of possible directions in dependence of the intra-prediction parameter and a line along which the reconstructed neighboring image samples serially extend, with, for a subset of the possible directions, provisionally performing the interpolation at a second fixed point precision increased relative to the first fixed point precision by an amount depending on the predetermined direction and then rounding the prediction value to the first prediction.

According to another embodiment, a method for intra predicting a block to be predicted of a picture from neighboring image samples sequentially extending along two rays, starting at a common intersection point and pointing into a different direction, the neighboring image samples having edge neighboring samples bordering the block to be predicted, may have the steps of: one-dimensionally filtering the neighboring image samples sequentially arranged into a sequence by anti-parallelly traveling along a first one of the two rays and parallelly traveling along a second one of the two rays to achieve a filtered image sample sequence; and determining a prediction value for a predetermined image sample of the block to be predicted by using the filtered image sample sequence.

According to another embodiment, a method for reconstructing a block of a picture defined in a first precision by prediction may have the steps of: reconstructing a reference image sample from a data stream at a second precision being equal to or greater than the first precision; extracting a transform coefficient block for the block from the data stream; determining predicted image samples for the block from the reconstructed reference image samples at a third precision higher than the second precision; applying an inverse spectral decomposition transform to the transform coefficient block to achieve reconstructed residual sample values for the block at a fourth precision greater than the first precision; and reconstructing the block by summation of the predicted image samples and the reconstructed residual sample values at an increased precision equal to or greater than at least one of the third and fourth precisions and reducing a result of the summation having the increased precision down to the second precision.

According to another embodiment, a method for encoding a block of a picture defined in a first precision may have the steps of: reconstructing reference image samples at a second precision being equal or greater than the first precision; determining predicted image samples for the block from the reconstructed reference image samples at a third precision higher than the second precision; comparing the predicted image samples and original image samples of the block of the picture defined in the first precision to determine residual sample values for the block; applying a spectral decomposition transform to the achieved residual sample values and using a quantization to achieve a transform coefficient block; applying an inverse spectral decomposition transform to the transform coefficient block to achieve the reconstructed residual sample values for the block at a fourth precision greater than the first precision; achieving reconstructed image samples of the block by summation of the predicted image samples and the reconstructed residual sample values at an increased precision equal to or greater than at least one of the third and fourth precisions and reducing a result of the summation having the increased precision down to the second precision; and inserting the transform coefficient block into a data stream.

According to another embodiment, a method for reconstructing a block of a picture by intra prediction may have the steps of: determining reconstructed values of neighboring image samples of the picture, neighboring the block from a data stream at a first fixed point precision; extracting an intra-prediction parameter from the data stream; and determining a prediction value for a predetermined image sample of the block from the reconstructed values of the neighboring image samples by performing an interpolation between the reconstructed values of the neighboring image samples at an intersection between a line crossing the predetermined image sample and extending in a predetermined direction selected from a set of possible directions in dependence of the intra-prediction parameter and a line along which the reconstructed neighboring image samples serially extend, with, for a subset of the possible directions, provisionally performing the interpolation at a second fixed point precision increased relative to the first fixed point precision by an amount depending on the predetermined direction and then rounding the prediction value to the first precision.

Another embodiment may have a computer readable digital storage medium having stored thereon a computer program having a program code for performing, when running on a computer, a method for intra predicting a block to be predicted of a picture from neighboring image samples sequentially extending along two rays, starting at a common intersection point and pointing into a different direction, the neighboring image samples having edge neighboring samples bordering the block to be predicted, which method may have the steps of: one-dimensionally filtering the neighboring image samples sequentially arranged into a sequence by anti-parallelly traveling along a first one of the two rays and parallelly traveling along a second one of the two rays to achieve a filtered image sample sequence; and determining a prediction value for a predetermined image sample of the block to be predicted by using the filtered image sample sequence.

Another embodiment may have a computer readable digital storage medium having stored thereon a computer program having a program code for performing, when running on a computer, a method for reconstructing a block of a picture defined in a first precision by prediction, which method may have the steps of: reconstructing a reference image sample from a data stream at a second precision being equal to or greater than the first precision; extracting a transform coefficient block for the block from the data stream; determining predicted image samples for the block from the reconstructed reference image samples at a third precision higher than the second precision; applying an inverse spectral decomposition transform to the transform coefficient block to achieve reconstructed residual sample values for the block at a fourth precision greater than the first precision; and reconstructing the block by summation of the predicted image samples and the reconstructed residual sample values at an increased precision equal to or greater than at least one of the third and fourth precisions and reducing a result of the summation having the increased precision down to the second precision.

Another embodiment may have a computer readable digital storage medium having stored thereon a computer program having a program code for performing, when running on a computer, a method for encoding a block of a picture defined in a first precision, which method may have the steps of reconstructing reference image samples at a second precision being equal or greater than the first precision; determining predicted image samples for the block from the reconstructed reference image samples at a third precision higher than the second precision; comparing the predicted image samples and original image samples of the block of the picture defined in the first precision to determine residual sample values for the block; applying a spectral decomposition transform to the achieved residual sample values and using a quantization to achieve a transform coefficient block; applying an inverse spectral decomposition transform to the transform coefficient block to achieve the reconstructed residual sample values for the block at a fourth precision greater than the first precision; achieving reconstructed image samples of the block by summation of the predicted image samples and the reconstructed residual sample values at an increased precision equal to or greater than at least one of the third and fourth precisions and reducing a result of the summation having the increased precision down to the second precision; and inserting the transform coefficient block into a data stream.

Another embodiment may have a computer readable digital storage medium having stored thereon a computer program having a program code for performing, when running on a computer, a method for reconstructing a block of a picture by intra prediction, which method may have the steps of: determining reconstructed values of neighboring image samples of the picture, neighboring the block from a data stream at a first fixed point precision; extracting an intra-prediction parameter from the data stream; and determining a prediction value for a predetermined image sample of the block from the reconstructed values of the neighboring image samples by performing an interpolation between the reconstructed values of the neighboring image samples at an intersection between a line crossing the predetermined image sample and extending in a predetermined direction selected from a set of possible directions in dependence of the intra-prediction parameter and a line along which the reconstructed neighboring image samples serially extend, with, for a subset of the possible directions, provisionally performing the interpolation at a second fixed point precision increased relative to the first fixed point precision by an amount depending on the predetermined direction and then rounding the prediction value to the first precision.

Embodiments according to a first aspect of the present invention provide an apparatus for intra predicting a block to be predicted of a picture from neighboring image samples. The image samples extend sequentially along two rays starting from a common intersection point and pointing into different directions, the neighboring image samples comprise edge neighboring samples, which border the block to be predicted. The apparatus comprises a smoothing filter and a determiner. The smoothing filter is configured to one-dimensionally filter the neighboring image samples sequentially arranged into a sequence by anti-parallelly traveling along a first one of the two rays and travelling antiparallely along a second one of the two rays, to obtain a filtered image sample sequence. The determiner is configured to determine the prediction value for a predetermined image sample of the block to be predicted by using the filtered image sample sequence.

It is an idea of embodiments according to the first aspect of the present invention, that a compression efficiency in video coding can be improved if a smoothing filter is used for filtering reference image samples (the neighboring image samples). It has been found, that an influence of outliers within the reference image sample can be reduced by using the smoothing filter. An advantage of embodiments according to the first aspect of the present invention, is therefore that by using the smoothing filter, outliers within the reference image samples do not negatively effect an intra prediction result. A resulting residual signal can therefore be reduced and represented with less bits than without the smoothing filter. Furthermore, by one-dimensionally filtering the reference image samples, a computational overhead is kept reasonable.

Embodiments according to a second aspect of the present invention provide an apparatus for reconstructing a block of a picture defined in a first precision by prediction. The apparatus comprises a reconstructor, an extractor, a predictor and an inverse transformer. The reconstructor is configured to reconstruct reference image samples from a data stream at a second precision being equal to or greater than the first precision. The extractor is configured to extract a transform coefficient block for the block of the picture from the data stream. The predictor is configured to determine predicted image samples for the block of the picture from the reconstructed reference image samples at a third precision, which is higher than the second precision. The inverse transformer is configured to apply an inverse spectral decomposition transform to the transform coefficient block to obtain residual sample values for the block at a further precision, which is greater than the first precision. The reconstructor is further configured to reconstruct the block of the picture by summation of the predicted image samples and the residual sample values at an increased precision equal to or greater than at least one of the third and fourth precisions, and reducing a result of the summation having the increased precision down to the second precision.

A precision may, for example, be a fixed point precision.

It is an idea of embodiments according to the second aspect of the present invention, that a compression efficiency in video coding can be improved, if a prediction and a reconstruction for a block of a picture to be predicted is performed in a higher precision, then the picture is defined. It has been found that by using a higher precision in the determination of predicted image samples for the block and in the reconstruction of the block, than using a precision in which the picture is defined residual sample values for the block can be reduced and, therefore, represented with less bits in a transmission. An advantage of embodiments according to the second aspect of the present invention is that by predicting and reconstructing in a higher precision than the picture is defined, a more precise prediction and reconstruction can be obtained, leading to a smaller residual information for the block.

Embodiments according to a third aspect of the present invention provide an apparatus for reconstructing a block of a picture by intra prediction. The apparatus comprises a reconstructor, an extractor and an intra predictor. The reconstructor is configured to determine reconstructed values of neighboring samples of the picture, which neighbor the block from a data stream, at a first fixed point precision. The extractor is configured to extract an intra prediction parameter from the data stream. The intra predictor is configured to determine a prediction value for a predetermined image sample of the block from the reconstructed values of the neighboring image. The intra predictor is configured to determine the prediction value by performing an interpolation between the reconstructed values of the neighboring image samples at an intersection between a line crossing the predetermined image samples and extending in a predetermined direction selected from a set of possible directions in dependence of the intra prediction parameter, and a line along which the reconstructed neighboring image samples serially extend. The intra predictor is further configured to, for a subset of the possible directions, perform the interpolation at a second fixed point precision increased relative to the first fixed point precision by an amount depending on the predetermined direction and then rounding the prediction value to the first prediction.

It is an idea of embodiments according to the third aspect of the present invention, that a computational load in video coding can be reduced, if an interpolation used to determine a prediction value for an image sample of a block to be predicted by intra prediction is performed at a fixed point precision, depending on a predetermined direction, which is dependent from an intra prediction parameter for the block. It has been found, that by performing an interpolation of each block, which has to be predicted by intra prediction dependent on an intra prediction parameter of the block instead of performing the interpolation for each block the same, a computational load for performing the interpolation can be reduced. An advantage of embodiments according to the third aspect of the present invention is that a computational load for determining an intra prediction of a block of a picture is reduced by performing an interpolation at a precision determined by an intra prediction parameter of the block.

BRIEF DESCRIPTION OF THE DRAWINGS

Embodiments of the present invention will be detailed subsequently referring to the appended drawings, in which:

FIG. 5 shows a table with different parameters used for intra prediction performed by the video encoder from FIG. 1 and the video decoder from FIG. 2;

DETAILED DESCRIPTION OF THE INVENTION

Figure 1:
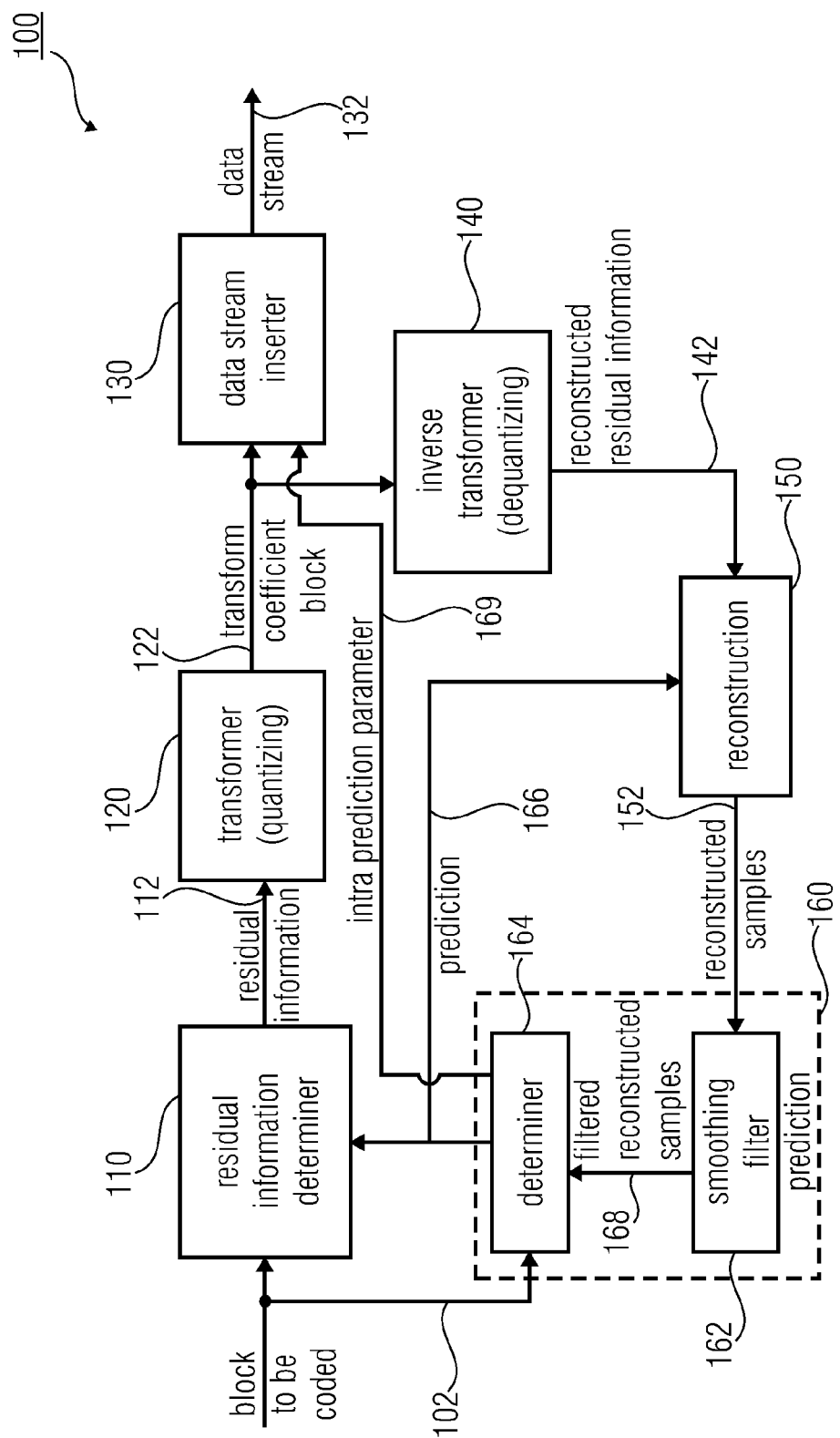
FIG. 1 shows a block diagram of a video encoder according to an embodiment of the present invention.

Before embodiments of the present invention will be explained in greater detail in the following on the basis of the Figs., it is to be pointed out that the same or functionally equal elements are provided with the same reference numerals in the figures and that a repeated description of these elements shall be omitted. Hence, the description of the elements provided with the same reference numerals is mutually interchangeable and/or applicable in the various embodiments.

FIG. 1 shows a block diagram of a video encoder 100 according to an embodiment of the present invention. The video encoder 100 comprises a residual information determiner 110, a transformer 120, a data stream inserter 130, an inverse transformer 140, a reconstructor 150 and a predictor 160. The predictor 160 comprises a smoothing filter 162 and a determiner 164.

As mentioned in the introductory of this application, a block of a picture, may be predicted using intra prediction or inter prediction. In the following, the main focus is lying on intra prediction, but embodiments of the present invention may be also configured to perform in inter prediction. The predictor 160 of the video encoder 100 is configured to determine a prediction 166 for a block 102 which has to be coded of the current picture of a video. The predictor 160 determines the prediction 166 for the block 102 based on reconstructed samples 152, which have been encoded before the current block. In the case of intra prediction, the reconstructed samples 152 are neighboring samples bordering the block 102 to be coded of the same picture like the block 102. In the predictor 160 the reconstructed samples 152 are filtered using the smoothing filter 162 to suppress outliers within the reconstructed samples 152, such that these outliers do not negatively affect (or only insignificantly negatively affect) the prediction 166 for the block 102. The smoothing filter 162 may, for example, be an FIR filter. The FIR filter may, for example, be a three tap FIR filter. The smoothing filter 162 determines filter reconstructed samples 168 of the reconstructed samples 152. A precision of the filtered reconstructed sample 168 may be higher than a precision of the reconstructed samples 152. The filtered reconstructed samples 168 may then be used by the determiner 164 of the predictor 160 to determine the prediction 166 for the block 102. The determiner 164 may compare original image samples of the block 102 with the filtered reconstructed samples 168 (which are bordering the block 102, and therefore neighboring edge image samples of the block 102) and determine an intra prediction parameter 169, which may define a prediction direction out of a set of possible prediction directions. A value of an image sample of the block 102 may be a value of one of the filtered reconstructed samples 168 or an interpolation of multiple values of the filtered reconstructed samples 168. Image samples of the block 102, lying on a common prediction line (pointing to the defined prediction direction) may have equal values. The determiner 164 determines then by combining the intra prediction parameter 169 with the filtered reconstructed samples 168, the prediction 166 for the block 102. A precision of the prediction 166 may be increased compared to the precision of the filtered reconstructed samples 168. This concept of intra predicting is explained in this application later on in more detail by using the FIGS. 3 to 6.

The residual information determiner 110 is configured to compare the prediction 166 for the block 102 with the (original) block 102 to determine a residual information 112 for the block 102. The residual information 112 determines the difference of the (original) block 102 and its prediction 166. As described before by using the smoothing filter 162 to filter the reconstructed samples 152 and by having an increased precision of the prediction 166 compared to the reconstructed samples 152 the residual information 112 can be kept smaller, than without using the smoothing filter 162 and with using the same precision of the prediction 166 compared to the reconstructed samples 152. The residual information 112 can, therefore, be represented by fewer bits. The transformer 120 may transform the residual information 112 and quantize the resulting transform coefficients to obtain a transform coefficient block 122. A quality loss (if any) in the video encoder 100 occurs in the quantization of the transform coefficients. The transform coefficient block 122 may then together with the intra prediction parameter 169 be inserted into a data stream 132 by the data stream inserter 130. The data stream 132 may be transmitted to a video decoder in which the block 102 may be reconstructed. The transform coefficient block 122 comprising the quantized transform coefficients representing the residual information 112 may be inverse transformed by the inverse transformer 140 to obtain reconstructed residual information 142 for the block 102. The reconstructed residual information 142 may show a loss compared to the residual information 112 because of the quantization of the transform coefficients in the transformer 120. The reconstructed residual information 142 are also available in a video decoder decoding the data stream 132. The reconstructed residual information 142 may be used by the reconstructor 150 in conjunction with the prediction 166 for the block 102 to obtain reconstructed samples 152 of the block 102, which then may be used as reference samples for a following block, which has to be predicted.

The video encoder 100 may further be configured to perform inter prediction. The predictor 160 may therefore, for example, be configured to determine if the block 102 should be interpredicted or intrapredicted. If the predictor 160 decides that the block 102 has to be interpredicted, the reconstructed samples 152 used to determine the prediction 166 of the block would be samples of previously encoded pictures. Furthermore, the predictor 160 would be configured to obtain an inter prediction parameter (for example a motion information for the block 102), which then would be inserted into the data stream 132 by the data stream inserter 130.

Figure 2:
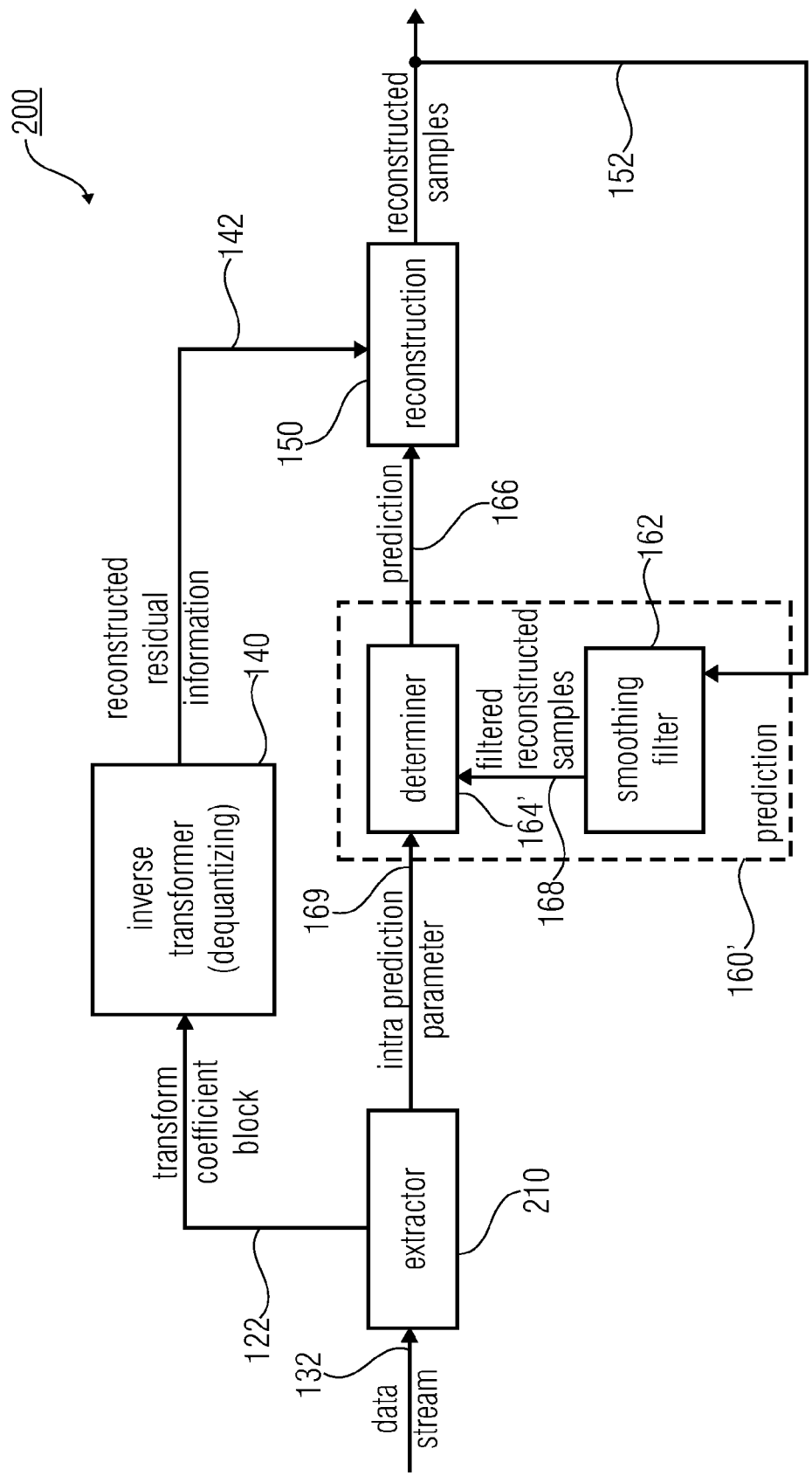
FIG. 2 shows a block diagram of a video decoder according to a further embodiment of the present invention.

FIG. 2 shows a video decoder 200 according to a further embodiment of the present invention. The video decoder 200 comprises an extractor 210, an inverse transformer 140, a reconstructor 150 and a predictor 160'. The video decoder 200 may be configured to decode the block 102, which may have been encoded with the video encoder 100 according to FIG. 1. The same reference numerals used in FIG. 2 like in FIG. 1, determine equal or similar elements in the video decoder 200 as in the video encoder 100. The extractor 210 is configured to extract the transform coefficient block 122 for the block 102 and the intra prediction parameter 169 for the block 102 from the data stream 132 (which, for example, is provided by the video encoder 100). The inverse transformer 140 obtains (like the inverse transformer 140 of the video encoder 100) the reconstructed residual information 142 for the block 102. The predictor 160' is configured to determine the prediction 166 for the block 102 by using the reconstructed samples 152 (which, for example, are previously decoded neighboring image samples, neighboring the block 102). The reconstructed samples 152 are filtered by using a smoothing filter 162 of the predictor 160' to obtain the filtered reconstructed samples 168. A determiner 164' of the predictor 160' may then obtain the prediction 166 for the block 102 based on the intra prediction parameter 169 for the block 102 and the filtered reconstructed samples 168. The determiner 164' may determine the prediction 166 for the block 102 on the same way like the determiner 164 of the video encoder 100. The determiner 164' may therefore be a reduced version of the determiner 164 of the video encoder 100. The determiner 164 of the video encoder 100 is, as mentioned before, further configured to obtain the intra prediction parameter 169 for the block 102.

The prediction 166 for the block 102 may then together with the reconstructed residual information 142 for the block 102 be combined by the reconstructor 150 to obtain a reconstructed version of the block 102 or reconstructed samples of the block 102. This reconstructed samples of the block 102, may be used again as reference samples for following blocks, which have to be decoded. Furthermore, the reconstructed samples of the block may be sent to a video output device, like a display. A precision of the reconstructed samples 152 obtained by the reconstructor 150 may be higher than the precision in which the block 102 is defined and, therefore, a rounding of the reconstructed samples 152 may be applied before sending the reconstructed samples 152 to the output device. Furthermore, as mentioned before, a precision of the filtered reconstructed samples 168 may be higher as the precision of the reconstructed samples 152 and a precision of the prediction 166 may be higher than a precision of the filtered reconstructed samples 168. A precision of the reconstructed residual information 142 may be higher than the precision in which the block 102 is defined.

Like the video encoder 100, the video decoder 200 may also be configured to perform inter prediction. The video encoder 100 may configured be to signal, within the data stream 132 if the block 102 is interpredicted or intrapredicted. The extractor 210 may extract this information out of the data stream 132 and the predictor 160' may depending on this information perform intra prediction or inter prediction to obtain the prediction 166 for the block 102.

The extractor 210 may be further configured to extract an inter prediction parameter for the block 102 (for example a motion information), which then may be used by the determiner 164' to obtain the prediction 166 for the block 102. The reconstructed samples 152, which are used in the predictor 160' to obtain the prediction 166 for the block 102 may in the inter prediction case be reconstructed samples of previously decoded pictures.

Figure 3:
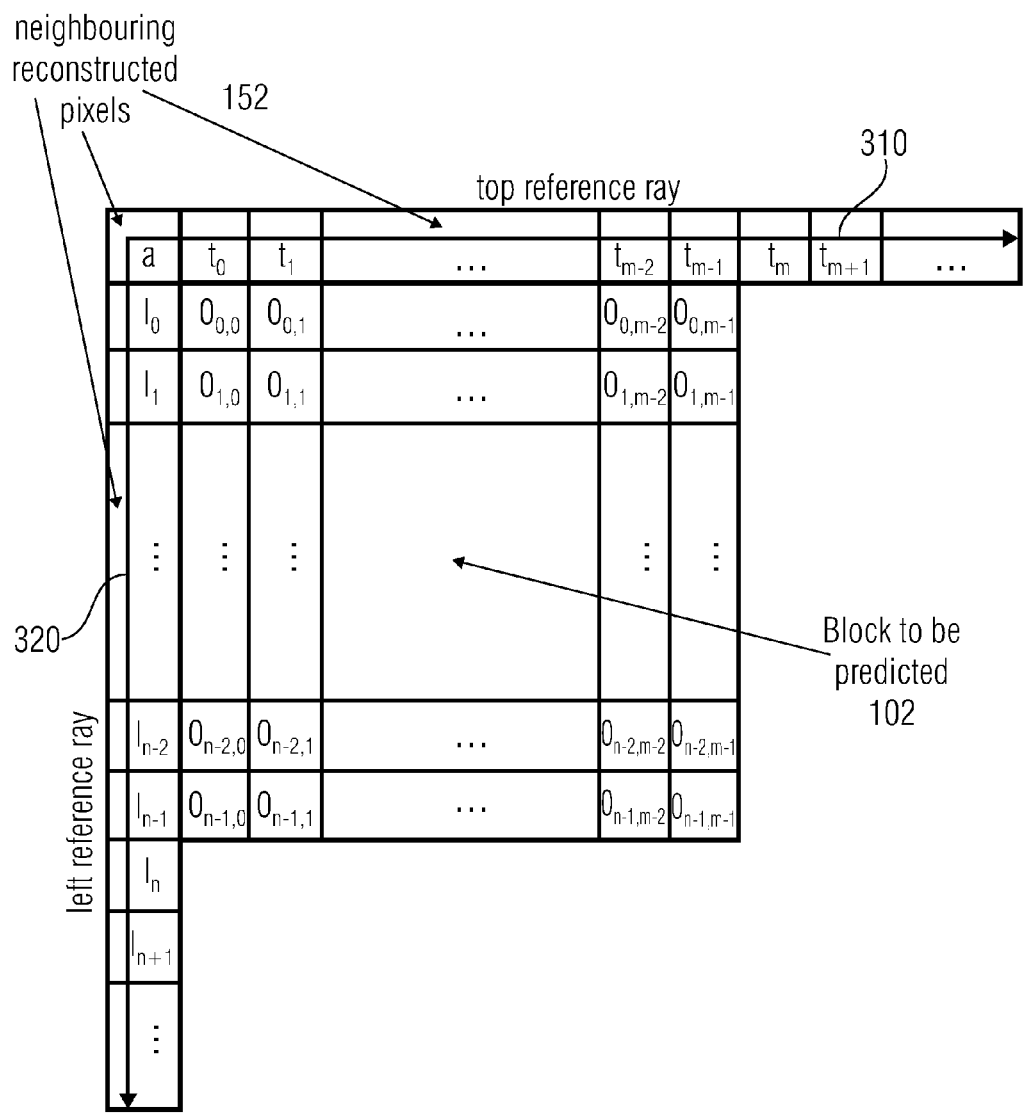
FIG. 3 shows a block to be predicted with neighboring reference samples.

In the following, a concept for directional inter prediction with increased precision for arbitrary size blocks of images of video data, which may be employed in the video encoder 100 and in the video decoder 200 is explained in more detail by using the FIGS. 3 to 6. As mentioned before, as reference sample for the intra prediction scheme already coded and reconstructed samples 152 of the same picture are used. FIG. 3 shows a block O of size n×m to be predicted together with its neighboring reconstructed samples 152. The original block O to be predicted consists of the n×m array of samples:

$$O = \begin{bmatrix} o_{0,0} & \cdots & o_{0,m-1} \\ \vdots & \ddots & \vdots \\ o_{n-1,0} & \cdots & o_{n-1,m-1} \end{bmatrix}.$$

The block O corresponds to block 102 which has been used in the description of the video encoder 100 and the video decoder 200.

A block P of samples that forms the prediction of the original block O is denoted as an n×m array:

$$P = \begin{bmatrix} p_{0,0} & \cdots & p_{0,m-1} \\ \vdots & \ddots & \vdots \\ p_{n-1,0} & \cdots & p_{n-1,m-1} \end{bmatrix}.$$

The block P corresponds to the prediction 166 which has been used in the description of the video encoder 100 and the video decoder 200.

The reconstructed sample values 152 of preceding blocks (in encoding and decoding order) relative to the current block O will be used as reference samples 152 for the prediction block P.

The preceding blocks are blocks of the same picture like the current block O. FIG. 3 shows the reconstructed sample values 152 that are potentially available for referencing. In particular, these are the left neighboring reconstructed sample values consisting of the vector $l = [l_0 \ldots l_{n-1} \ldots]^T$, the top neighboring reconstructed sample values consisting of the vector $t = [t_0 \ldots t_{m-1} \ldots]^T$, and the top-left neighboring reconstructed sample value a.

For the derivation process of the elements (of the image samples) $p_{x,y}$ of the prediction array P (the prediction block P), all samples are assumed to be sample values that recite on a square grid with constant distance d between horizontally and vertically neighboring samples. Furthermore, two rays are defined that both start at the grid point of the neighboring value a. The first ray is denoted as a top reference ray 310 and it crosses all grid points of the top neighbors (vector t), the second ray is denoted as a left reference ray 320 and it crosses all grid points of the left neighbors (vector l). The elements of the vectors t and l together with the value a define a new reference vector $q = [\ldots l_{n-1} \ldots l_0 \, a \, t_0 \ldots t_{m-1} \ldots]^T$ where neighboring values on the square grid are also neighboring elements in q. This reference vector q forms the reconstructed samples 152, used for determining the prediction 166 of the block 102 which have been used in the description of the video encoder 100 and the video decoder 200. In other words, the reconstructed samples 152 are neighboring samples, which are sequentially arranged into a sequence (the reference vector q). The first element of the new reference vector q is the last element of the vector l and the last element of the reference vector q is the last element of the vector t or vice versa.

For deriving the prediction 166 for the block 102, three or four parameters may be chosen. The first parameter is the number of bits k by which the bit depth (of the reconstructed samples 152) is increased for calculating the prediction 166 for the block 102. The second parameter is a rational valued slope r for determining the dominant prediction direction and the third parameter is an interpolation filter. The slope r may also be equal to plus infinity in which case it is assumed that its related prediction direction line is parallel to the left reference ray 320. The slope r may also be equal to zero in which case it is assumed that its related prediction direction line is parallel to the top reference ray 310. If the slope r is positive, a fourth (binary) parameter needs to be specified, which determines from which of the two reference rays the prediction 166 for the block 102 is to be predicted, which will be described in more detail later.

According to some embodiments, given the neighboring reconstructed reference sample values 152 as elements of the vector q, a new reference vector $\hat{q}$ is formed by multiplying each element (each image sample) of q with $2^k$ or equivalently, by shifting left each element of q by k bits to get an increased bit-depth representation of the reference samples (of the reconstructed samples 152).

As it can be seen from FIG. 3, elements of the vector l and elements of the vector t may be not available, for obtaining the prediction 166 for the block 102, because these elements may not have been coded yet. For example, the elements $t_n$, and $t_{m+1}$ of the vector t may not be available and/or the elements $l_n$ and $l_{n+1}$ of the vector l may not be available. Therefore, elements of $\hat{q}$ that stem from preceding blocks that are coded (encoded or decoded) before block 102 are marked as available. All other elements of $\hat{q}$ are marked as not available (for example the elements $t_m$, $t_{m+1}$ and/or $l_n$, $l_{n+1}$). Additionally, rules may be defined to change the marking for certain elements of $\hat{q}$ from available to not available. This can be beneficial in order to limit the complexity of deriving $\hat{q}$ or to improve the error resilience. Elements of $\hat{q}$ that are marked as not available are interpolated or extrapolated based on values in $\hat{q}$ that are marked as available. Such that for every element of $\hat{q}$ exists a value.

Figure 4:
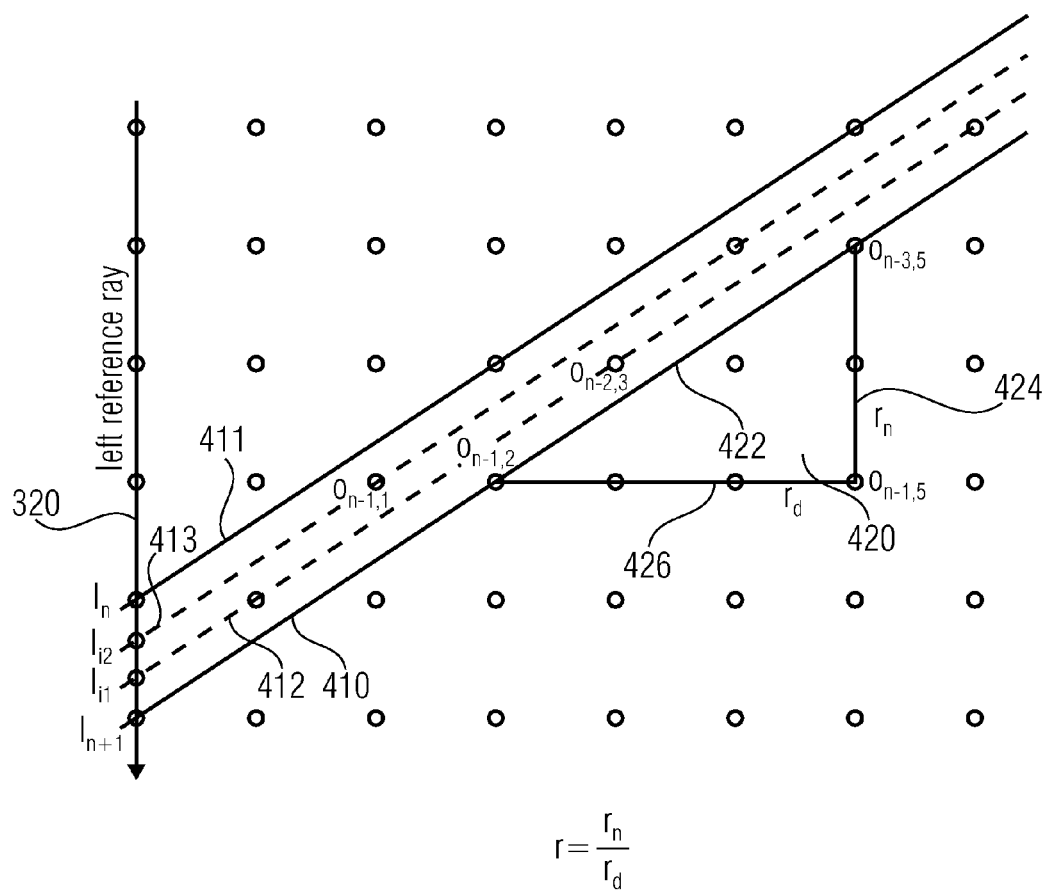
FIG. 4 shows an example, which illustrates how to determine interpolation points.

For each point of the top reference ray 310 and the left reference ray 320 an interpolated value (which may be between grid points of the elements of the vectors l and t) can be calculated by applying a chosen interpolation filter to $\hat{q}$. For calculating an individual value $p_{x,y}$ of the prediction array P, a prediction line 410 (which is shown in FIG. 4) with the slope r is drawn through the grid point of the corresponding original sample $o_{x,y}$ (in the example in FIG. 4 through $o_{n-1,2}$). If the slope r is negative, the corresponding prediction line 410 crosses only one of both reference rays (or goes through the point a). In this case, the value of $p_{x,y}$ is the interpolated value at the crossing point of the corresponding reference ray (the left reference ray 320 or the top reference ray 310) and the prediction line 410 crosses. If the slope r is positive (like in the example shown in FIG. 4), the prediction line 410 crosses both reference rays (the left reference ray 320 and the top reference ray 310). In this case, as mentioned before, a further binary parameter needs to be specified that decides whether to use the left reference ray 320 or the top reference ray 310 for prediction, i.e. for the prediction of the value $p_{x,y}$. Then, the value of $p_{x,y}$ is the interpolated value at the crossing point of the prediction line 410 with the specified reference ray. The crossing point may lie between grid points of the vector t or vector l. This crossing point has therefore be interpolated (by using values of the elements of the vector l and/or the vector t). In the specific case where the slope r equals to infinity, the corresponding prediction line 410 is parallel to the left reference ray 320. In the specific case where the slope r equals to zero, the corresponding prediction line

410 is parallel to the top reference ray 310. The prediction line 410 crosses in these two specific cases the left reference ray 320 or the top reference ray 310 in grid points of elements of the vector l or of elements of the vector t. The corresponding prediction value $p_{x,y}$ may therefore be a value of the corresponding element of the vector l or of the vector t or an interpolated version thereof.

Since a rational valued slope r is used, only a small number of interpolation positions ($l_{i1}$ and $l_{i2}$ in the example shown in FIG. 4) between two neighboring horizontal or vertical values (of the vector l or the vector t, for example, the values $l_n$ and $l_{n+1}$ in the example shown in FIG. 4) have to be calculated. These interpolated values (for example $l_{i1}$, $l_{i2}$) need to be calculated only once, which reduces the complexity of the approach. The number of interpolation points between two horizontally or vertically neighboring points on the dot raster grid equals the number of possible lines of the slope r that cross an imaginary line segment between these two horizontally or vertically neighboring points and that cross other points (grid points of elements of the original block O) of the dot raster grid. In FIG. 4 an example of this is shown, wherein two lines (the prediction line 410 and a second prediction line 411) of slope r cross two vertically neighboring points ($l_{n+1}$, $l_n$) of the left reference ray 320. The first prediction direction line 410 crosses the point $l_{n+1}$ and the second prediction direction line 411 crosses the point $l_n$ of the left reference ray 320. The points $l_n$ and $l_{n+1}$ equal dot raster points of the corresponding elements $l_n$ and $l_{n+1}$ of the vector l. From the irreducible form of slope r with $r_n$ being the nominator and $r_d$ being the denominator, a right triangle 420 can be constructed, such that its hypotenuse 422 lies on the lower line 410 and a vertical cathetus 424 of length $r_n$ and a horizontal cathetus 426 of length are $r_d$ exists. Since $r_n$ and $r_d$ are natural numbers, a cathetus that starts on a dot raster point also ends on a dot raster point. For example, the vertical cathetus 424 starts at the dot raster point, which equals a dot raster point of an element $o_{n-1,5}$ of the original block O and ends at a dot raster point, which equals a dot raster point of an element $o_{n-3, 5}$ of the original block O. The horizontal cathetus 426 starts at the dot raster point being equal to the dot raster point of the element $o_{n-1,5}$ and ends at a dot raster point equal to a dot raster point of the element $o_{n-1,2}$ of the original block O. Therefore, in the example shown in FIG. 4, $r_n$ equals 2 and $r_d$ equals 3 and the slope r of the first prediction direction line 410 and the second prediction direction line 411, which is parallel to the first prediction direction line 410 equals ⅔. From this follows that when the hypotenuse 422 starts on a dot raster point (in the example shown in FIG. 4 the point $o_{n-1,2}$) of the dot raster grid, it also ends on a point (in the example shown in FIG. 4, the point $o_{n-3,5}$) of the dot raster grid. Thus, a line of slope r that crosses one point of the dot raster grid, needs to cross points of the dot raster grid in steps of the length of the hypotenuse (in the example shown in FIG. 4 the first prediction direction line 410 crosses the point $o_{n-1,2}$ and the point $o_{n-3,5}$). Therefore, all interpolation points can be found by parallel shifting the hypotenuse from the lower prediction direction line 410 to the upper prediction direction line 411. In FIG. 4 parallel shifted versions of the first prediction line 410 are shown with dashed lines. A first parallel shifted prediction direction line 412 crosses, for example, a dot raster point which is equal to a dot raster point of an element $o_{n-2,3}$ of the original block O. This first parallel shifted prediction direction line 412 crosses the left reference ray 320 in a first interpolated point $l_n$ between the two neighboring points $l_n$ and $l_{n+1}$. A second parallel shifted prediction direction line 413 crosses a dot raster point, which equals a dot raster point of an element $o_{n-1,1}$ of the original block O and crosses the left reference ray 320 in a second interpolation point $l_{i2}$ between the two neighboring points $l_n$ and $l_{n+1}$. The dot raster points lying on the line, which coincides with the parallel-shifted hypotenuse are those grid points for which one and the same crossing point value on the reference ray (on the left reference ray 320) needs to be interpolated. For example, for the points $o_{n-1,2}$ and $o_{n-3,5}$ the point $l_{n+1}$ would have to be interpolated. This means that a value of a prediction $p_{n-1,2}$ and of a prediction $p_{n-3,5}$ would be equal to an interpolated value of the point $l_n$. An interpolation value for the point $l_n$ may, for example, be determined by adding a quarter of the value of the element $l_n$ of the reference vector q or the new reference vector $\hat{q}$, and a half of a value of the element $l_{n+1}$ of the reference vector q or the new reference vector $\hat{q}$, and a quarter of a value of an element $l_{n+2}$ of the reference vector q or the new reference vector $\hat{q}$.

In case, where the directional prediction modes are not suitable it may be important to have a fallback prediction mode. For this purpose, a so-called DC prediction mode provides a constant prediction value $p_{x,y}$ given as the average (DC or expected value) of all elements of $\hat{q}$ that are marked as available and subsequent rounding of this average values to the nearest integer value in the increased bit-depth domain. For the DC prediction modes no additional parameters need to be specified.

In the following, an example is shown, for an efficient signaling of the prediction mode for the block 102. According to some embodiments of the present invention, the parameter k is a fixed value, or signaled only once per frame (for example of a picture) or sequence. An efficient signaling for the remaining prediction parameter through each block of a picture is according to some embodiments of the present invention achieved by using nine sets of parameters (modes). They consist of eight directional prediction modes and the DC fallback mode. FIG. 5 shows a table with the nine possible parameter sets (modes) that may be used to predict a given block (the block 102). To signal a chosen intra prediction mode for a given block, only its mode index needs to be signaled (for example as the intra prediction parameter 169). This may be done in two steps. First, a so-called most probable mode may be derived depending on the modes of already coded neighboring blocks. The most probable mode may, for example, be the mode, which has been used for deriving predictions for the most of the neighboring blocks. Then, one flag is signaled, which has the value of one (or binary "TRUE") if the mode for the current block equals the most probable mode and a value of zero (or binary "FALSE") otherwise. This flag may be called most-probable-ipredmode-flag. For encoding and decoding this flags, one of three probability models (one of three contexts, for example, in an entropy decoder) are used, depending on the corresponding values of the same flag for the left and top neighboring block. If this flag has a value of one, signaling of the mode for the current block is finished. A prediction for the current block is, therefore, carried out using the most probable mode. If the flag has the value zero, an index called intra-pred-mode is derived that equals to the mode index if the mode index for the prediction of the current block is smaller than the mode index of the most probable mode and mode index −1, otherwise. Thus, the value intra-pred-mode is in the interval (0 . . . 7) and its binary representation fits into three bits. These three bits may be written from LSB to MSB and a separate probability model for each bit may be used.

The table shown in FIG. 5 shows the nine different indexes, which may be used for predicting a current block 102 the first column displays the mode index for the used prediction mode (for the used prediction direction). The mode index, may, as mentioned before, be transmitted as an intra prediction parameter 169 within the data stream 132 from the video encoder 100 to the video decoder 200 and may be extracted by the extractor 210 of the video decoder 200.

The second column shows a name, which corresponds to a direction of the prediction for each prediction mode.

The third column determines the type of each prediction mode.

The fourth column determines a slope r of a prediction direction line corresponding to each mode index. As mentioned before, a prediction direction line with a slope infinity may be parallel to the left reference ray 320 (mode index 0) and a prediction direction line with a slope zero may be parallel to the top reference ray 310 (mode index 1). For the DC fallback mode (mode index 2) no prediction direction line exists.

The fifth column specifies an interpolation filter for each mode index, wherein FP designate full pel resolution and HP designates half pel resolution. As can be seen from the table, for the mode indices 0, 1, 3, 4 only full pel resolutions are available. This means, a prediction direction line corresponding to one of these mode indices, which crosses a dot raster point of an element of the block B also crosses a dot raster point of the top reference ray 310 or the left reference ray 320. Therefore, in these cases no intermediate positions between neighboring dot raster points of the left reference ray 310 and top reference ray 320 need to be calculated. In the case of the mode indices 0 and 1, no interpolation at all has to be performed, because the element of the block 102 would obtain the value of the corresponding element of the reference vector $\hat{q}$ In the case of the mode indices 3 and 4 an interpolated value may be obtained by summing a half of the value of the element of the reference vector $\hat{q}$ through the grid point of which the prediction line crosses and a quarter of each of the two neighboring elements in the reference vector $\hat{q}$ of the element, through the grid point of which the prediction line crosses. In the case of the mode indices 5, 6, 7 and 8 half pel positions are also possible. This means, the prediction direction line crossing a grid point of an element of the block 102 may cross the top reference ray 310 or the left reference ray 320 between two neighboring grid points of the top reference ray 310 or the left reference ray 320. Therefore a value of this intermediate element may be calculated. The value of this intermediate element may be obtained by summing a half of a value of an element corresponding to the grid point before the interpolation element and a half of a value of an element corresponding to the grid point behind the intermediate element.

The fifth column defines from which reference ray of the two reference rays a prediction has to be done. This is only useful in the case, where the slope is greater than zero, as mentioned before, in this case a prediction direction line crosses the left reference ray 320 and the top reference ray 310.

Figure 6:
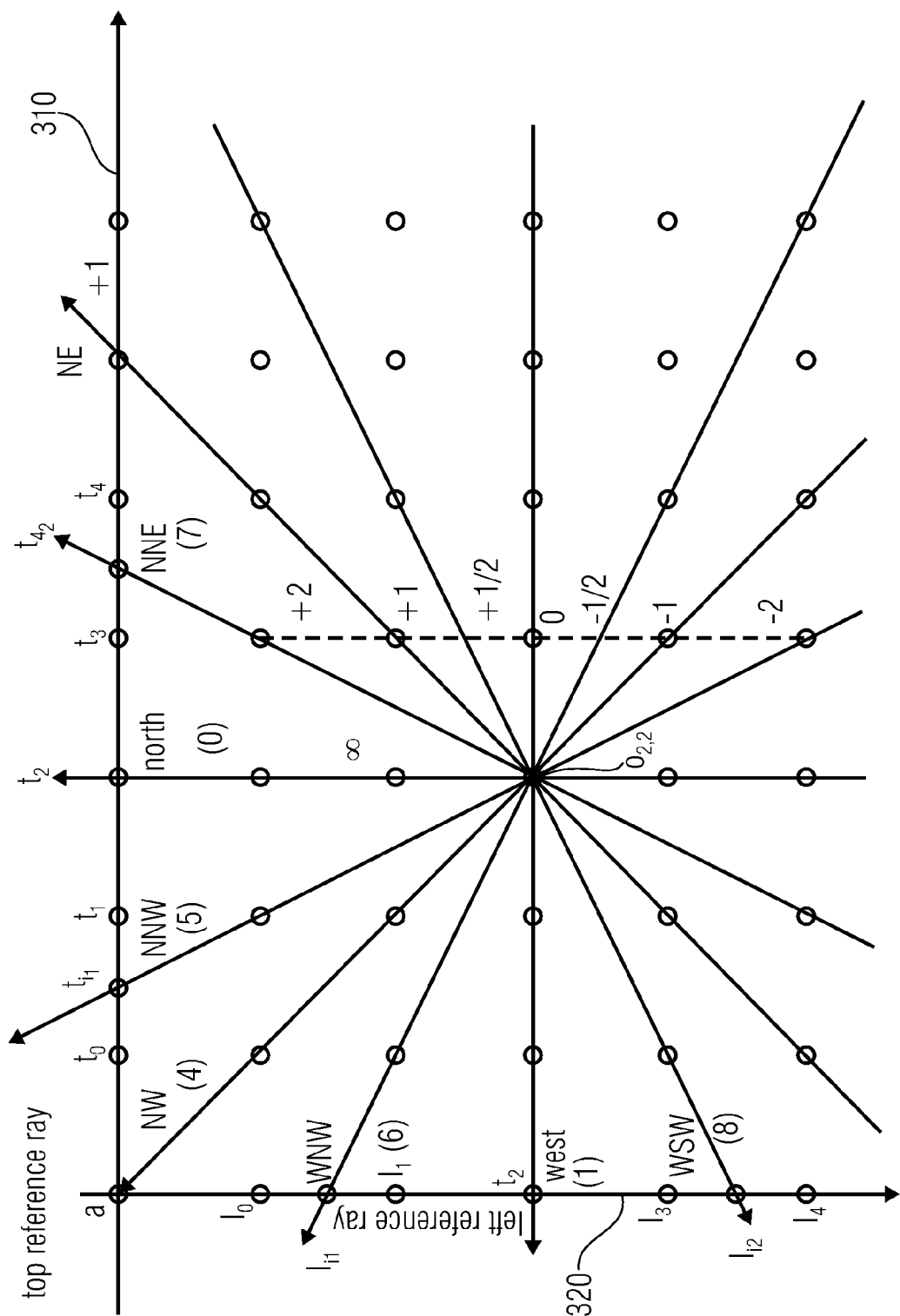
FIG. 6 shows an example on how to predict an image sample using the table from FIG. 5.

FIG. 6 shows an example for the possible modes of predicting a value for an element $o_{2,2}$ of the original block B. For each prediction direction line its mode name is shown next to the prediction direction line and its corresponding mode index is shown in brackets next to the prediction direction line. It can be seen that prediction direction lines with a slope a>0 cross the top reference ray 310 and the left reference ray 320. This applies for the mode indices 3, 7 and 8. The value for the element $o_{2,2}$ would be obtained in the mode indices 4 and 7 by interpolated values from the top reference ray 310 and in the case of the mode index 8 by an interpolated value from the left reference ray 320. As an example for a half pel position, an intermediate point $l_{i1}$ has to be calculated between the grid point $l_0$ and $l_1$ which corresponds to grid points of the elements $l_0$ and $l_1$ of the new reference vector $\hat{q}$.

As described before for the video encoder 100 and the video decoder 200, the reconstructed samples 152 may be filtered with a smoothing filter 162 to obtain filtered reconstructed sample 168. In other words, a further filtering step can be applied to the new reference vector $\hat{q}$, before calculating the prediction P. According to some embodiments, this further (smooth) filtering may be applied adaptive, that means for each block, an encoder may decide whether to apply this additional filtering step or not. This decision may be signaled as a so-called most_probable_ipred_mode_flag. This flag may be encoded and decoded after the intra_pred_mode syntax element and may use one separate probability model. A specific smoothing filter that may be applied to q (or to the reconstructed samples 152, and higher precision version of the reconstructed sample 152) is given by the array of filter taps (¼, ½, ¼). Therefore, the smoothing filter 162 may, for example, be an FIR filter and in this special case a 3-tap FIR filter.

An alternative method for increasing the bit depth of the prediction is to modify the interpolation filters (used for the prediction) and the smoothing filter 162 (instead of computing the new reference vector $\hat{q}$ out of q). In this way, it may be possible to obtain a prediction 166 that has an increased bit depth without the need for additional computation steps. All filter coefficients of a particular interpolation or smoothing filter 162 are multiplied with a power of 2 which corresponds to a binary left shift. Frequently, filters are used whose coefficients consist of fractions that all have the same power of 2 as denominator. The filtering operation for filters of this type can be carried out by multiplying the samples (the reconstructed samples 152 or the reference vector q) with the numerators of the filter coefficients only, and then applying a binary right-shift to the sum of the product. When filtering like this, the final right-shift (in the filters) can be merged with a left-shift (the left-shift by k) that may be used for increasing the bit-depth. According to some embodiments, this can even lead to not shifting at all, which corresponds to a reduction of the complexity. The bit-depth of a particular prediction block depends on the bit-depth increase that is incorporated into the smoothing filter 162 and interpolation filters that are used. This can lead to a prediction 166 of different bit depths for differing blocks of the picture, which needs to be considered in the residual reconstruction process (in the reconstructor 150). If, for example, a block is predicted, using mode index 0 or 1 from the above mentioned example, no interpolation is necessary and therefore a bit depth increase is not necessary, either. In other words, a bit depth increase, may depend on the used mode index, and therefore on the intra prediction parameter 169, which may determine a prediction direction out of a set of possible prediction directions. These differing bit depths are considered in the residual reconstruction process by deriving the reconstructed residual signals (the reconstructed residual information 142) with an increased bit depth such that it matches the bit depth of the corresponding prediction signal 166. Then, prediction and residual signal are added (in the reconstructor 150), followed by a step that reduces the intermediate bit depth to the bit depth of the original signal. In other words, a precision of the reconstructed residual information 142 and of the prediction 166 may be higher than a precision, at which the block 102 is coded.

Depending on the type of residual processing used, a higher bit-depth representation may be intrinsically available (without increasing computational complexity much), for instance integer implementations of a DCT like inverse transform (in the inverse transformer 140) usually use a binary right shift as final step to complete the computation of a particular residual sample value (of the reconstructed residual information 142). This means, for this final step, a higher bit depth is intrinsically available which can be used. The inverse transformer 140, may therefore omit this final step of rounding and the higher bit-depth version of the reconstructed residual information 142 may be used in the reconstructor 150 to obtain the reconstructed samples 152.

An advantage of carrying out the prediction and residual reconstruction step (in the reconstructor 150) in a higher bit-depth is that a rounding only occurs once. Therefore, in embodiments of the present invention, a computational load is decreased, compared to systems in which a rounding of the prediction and a rounding of the residual information occurs before the reconstruction step. Furthermore, a higher bit-depth prediction 166 and a higher bit-depth reconstruction residual information 142 may lead to higher precise reconstructed samples 152 of the block 102, and therefore to a smaller needed residual information, as in systems, wherein a rounding of prediction samples and of reconstructed residual samples occurs before the prediction and residual reconstruction process. Furthermore, the prediction process as described here tends to produce smooth predictions. This is also true for DCT-like inverse transform (in the inverse transformer 142) in the residual reconstruction step, especially when a strong quantization of the transform coefficients (in the transformer 120) is involved. By adding a smooth prediction to a smooth residual in a higher bit-depth contouring artifacts may be avoided (or at least significantly reduced). Embodiments of the present invention, enable therefore, a higher quality of the reconstructed samples 152 than, in where a bit-depth of the prediction and the reconstructed residual information is the same, like the bit-depth, in which the block 102 and reconstructed samples 152 are defined.

According to some embodiments of the present invention, any interpolation filters and smoothing filters of a video encoder or a video decoder comprise filtering coefficients, which are multiple of ¼. In this case, each filter coefficient of this filters may be multiplied with four, which turns each coefficient into an integer and increases the bit-depth by two bits for each filtering operation. Furthermore, when the block-adaptive smoothing is not used (for example if the smooth_ref_samples_flag is false), a modified version of the utilized interpolation filter may be used, with each filter coefficient multiplied by 4 once more to achieve a bit-depth increase by 4 bit, when this filter is used. In this way, it is insured that after the interpolation step, the bit-depth of the prediction 166 is increased by 4 bits, regardless whether the smoothing filter 162 was used or not. Furthermore, for both, the smoothing filter 162 and the interpolation filter, a final bit-shift may not be necessary, since all filter coefficients are integers. With this concept, it is possible to calculate a prediction 166 of a bit-depth increased by 4 bit only, while avoiding rounding operations for any combination of smoothing and interpolation filters with filter coefficients that are multiples of ¼ (see table 5, wherein all filter coefficients of the interpolation filter are multiples of ¼). According to further embodiments of the present invention, the smoothing filter 162 and the interpolation filter may have arbitrary filtering coefficients. According to these embodiments, each filter coefficient of the smoothing filter 162 and interpolation filters is multiplied by 4, which increases the bit-depth by 2 for each filtering operation. Furthermore, when block-adaptive smoothing filtering is not used (for example, if the smooth_ref_samples_flag is zero), a modified version of the utilized interpolation filter is used, with each coefficient multiplied by 4 once more to achieve a bit-depth increase by 4 bit, when this filter is used. In this way, it is insured that after the interpolation step, the bit-depth of the prediction 166 is increased by 4 bits, regardless whether the smoothing filter 162 was used or not. With this method, it is possible to calculate a prediction 166 with a bit-depth increased by 4 bit for any combination of smoothing filter 162 and interpolation filters with arbitrary filter coefficients.

According to further embodiments of the present invention, a predictor 160 may also be configured to increase the bit-depth of the prediction 166 depending on the block 102 to be coded. This increase in bit-depth may, for example, be signaled in the data stream 132, for example, within the intra prediction parameter 169.

In the following, more generalized descriptions for the aspects of the present invention, which have been described above using the precise example will be given.

Figure 7:
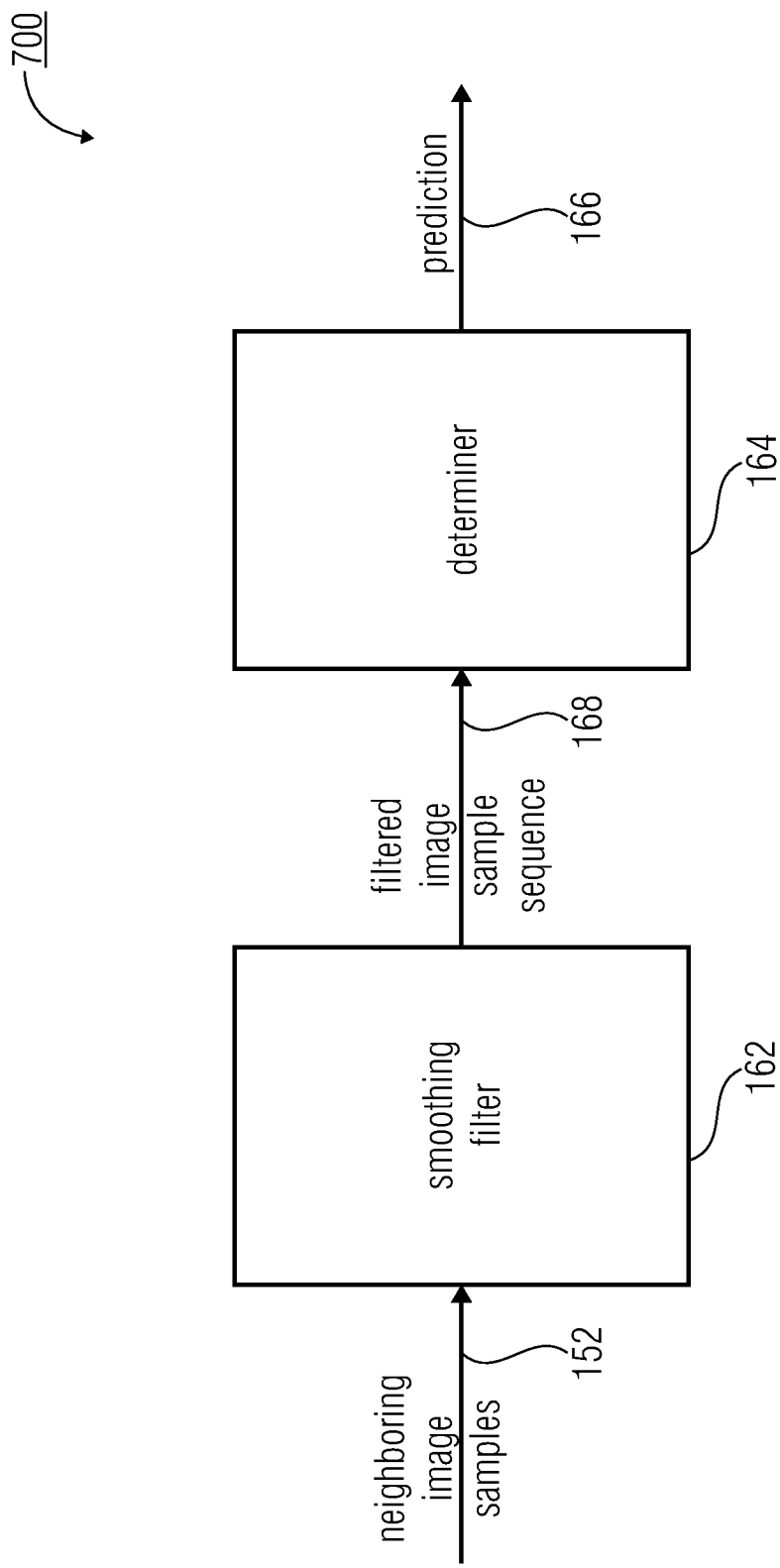
FIG. 7 shows a block diagram of an apparatus according to an embodiment according to the first aspect of the present invention.

FIG. 7 shows a block diagram of an apparatus 700 according to an embodiment according to the first aspect of the present invention. The apparatus 700 for intra predicting a block 102 to be predicted of a picture from neighboring image samples 152, sequentially extending along two rays (the top reference ray 310 and the left reference ray 320) starting at a common intersection point (a) and pointing into different directions, the neighboring image samples 152 comprising edge neighboring samples bordering the block 102 to be predicted, comprises a smoothing filter 162 and a determiner 164. The smoothing filter 162 is configured to one-dimensionally filter the neighboring image samples 152, which are sequentially arranged into a sequence (the reference vector q or the new reference vector q̂) by anti-parallelly traveling along a first one (for example along the left reference ray 320) of the two rays and parallelly traveling along a second one (for example, along the top reference ray 310) of the two rays, to obtain a filtered image sample sequence 168. The apparatus 700 further comprises a determiner 164 configured to determine a prediction value ($p_{x,y}$) for a predetermined image sample ($o_{x,y}$) of the block 102 to be predicted by using the filtered image sample sequence 168. The apparatus 700 may be employed in the hybrid video decoder 100 and in the hybrid video decoder 200. As it can be seen from the reference numerals, the neighboring image samples 152 may correspond to the reconstructed samples 152 of the video encoder 100 and the video decoder 200. The smoothing filter 162 is configured to filter these neighboring image samples 152 to obtain the filtered image sample sequence 168, which corresponds to the filtered reconstructed samples 168 in the video encoder 100 and the video decoder 200. The determiner 164 of the apparatus 700 may be the determiner 164 of the video encoder 100 or the determiner 164' of the video decoder 200. The determiner 164 obtains, based on the filtered image sample sequence 168 a prediction 166 for the block 102. In other words, the determiner obtains a prediction value for a predetermined image sample of the block 102. The determiner 164 determines therefore a prediction value for every image sample of the block 102, which then forms the prediction 166 or the block P, like it has been called above, too. An advantage of using a smoothing filter to filter the neighboring image samples 152 or the reconstructed samples 152 is that outliers within the neighboring image samples 152 do not negatively affect the intra prediction result (the prediction 166). The computational overhead may be kept reasonable.

As mentioned before, a bit-depth representation of the filtered image sample sequence 168 may be higher than a bit-depth representation of the neighboring image samples 152. In other words, a precision of the filtered image sample sequence 168 may be higher than a precision of the neighboring image samples 152. A precision of the prediction 166 may be even higher than the precision of the filtered image sample sequence 168.

According some embodiment of the present invention, the determiner 164 may be configured to determine a prediction value $p_{x,y}$ for the block 102 to be predicted by interpolating the filtered image sample sequence 168 at an intersection between a line (prediction direction line) crossing a predetermined image sample $o_{x,y}$ in a predetermined direction associated with the block 102 to be predicted, and the first (for example, the top reference ray 310 and/or the second ray (for example, the left reference ray 320).

As mentioned before, during interpolating the filtered image sample sequence 168 (in the determiner 164) the precision of the filtered image sample sequence 168 may be increased, such that the precision of the prediction 166 (of the prediction value $p_{x,y}$) is higher than the precision of the filtered image sample sequence 168.

According to some embodiments of the present invention, the apparatus 700 may be configured to selectively deactivate the smoothing filter 162, dependent on a filter information (for example, within the intra prediction parameter 169) for the block. The determiner 164 may be further configured to selectively determine the prediction value $p_{x,y}$ for the predetermined image sample $o_{x,y}$ of the block 102 by using the filtered image sample sequence 168 or by using the neighboring image samples 152, dependent on the filter information for the block. In the encoder 100 this filter information may be determined by the determiner 164, and included in the intra prediction parameter 169. In the video decoder 200 the determiner 164' may decide, based on the filter information within the intra prediction parameter 169 if the reconstructed samples 152 have to be filtered using the smoothing filter 162 before determining the prediction 166. In other words, embodiments of the present invention may be configured to make a decision, if the smoothing filter 162 should be applied to the reconstructed samples 152 or not.

According to some embodiments of the present invention, the smoothing filter 162 may be an FIR filter. The FIR filter may for example be a 3-tap FIR filter.

According to further embodiments of the present invention, the coefficients of the smoothing filter 162 may be a multiple of ¼.

According to further embodiments of the present invention, the smoothing filter is determined by an array of filter taps proportional to: (¼, ½, ¼).

An advantage of using a one-dimensionally smoothing filter, instead of using a two-dimensional smoothing filter is a reduced complexity. Referring to the above-mentioned example, the smoothing filter would be applied starting from the last value of the vector l and ending in the last value of the vector t. Therefore, the smoothing filter is traveling along the reference image samples 152, bordering the block 102 to be predicted. Hence, the smoothing filter is travelling in a first direction (a vertical direction) along the elements of the vector l and in a second direction (a horizontal direction) along elements of the vector t. The smoothing filter 162 changes the direction at the element a of the reference vector q or the new reference vector q̂.

Figure 8:
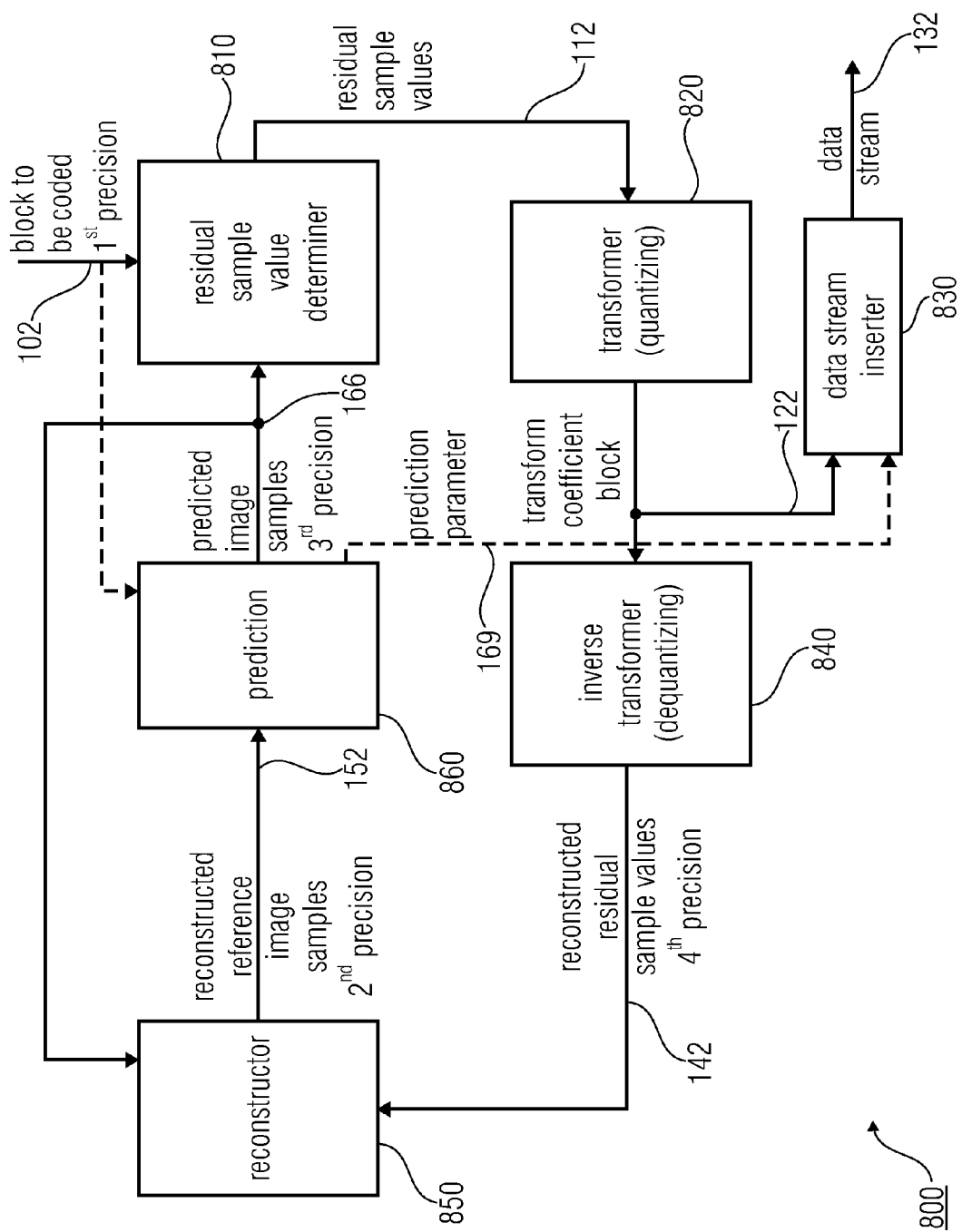
FIG. 8 shows an apparatus according to an embodiment according to the second aspect of the present invention.

FIG. 8 shows a block diagram of an apparatus 800 according to an embodiment according to the second aspect of the present invention. The apparatus 800 for encoding a picture, which is defined in a first precision comprises a reconstructor 850, a predictor 860, a residual sample value determiner 810, a transformer 820, an inverse transformer 840 and a data stream inserter 830.

The reconstructor 850 is configured to reconstruct reference image samples at a second precision being equal to or greater than the first precision in which the block 102 to be coded is defined. The predictor 860 is configured to determine predicted image samples 166 for the block 102 from the reconstructed reference image samples 152 at a third precision, which is higher than the second precision. The residual sample value determiner 810 is configured to compare said predicted image samples 166 and original image samples of the block 102 of the picture defined in the first precision to determine residual sample values 112 for the block 102. The transformer 820 is configured to apply a spectral decomposition transform (for example a discrete cosine transform) to the obtained residual sample values 112 and to use a quantization to obtain a transform coefficient block 122. The inverse transformer 840 is configured to apply an inverse spectral decomposition transform (for example, an inverse discrete cosine transform) to the transform coefficient block 122 to obtain reconstructed residual sample values 142 for the block 102 at a fourth precision, which is greater than the first precision. The reconstructor 850 is further configured to obtain reconstructed image samples for the block 102 by summation of the predicted image samples 166 and the reconstructed residual image samples 142 at an increased precision equal to or greater than the at least one of the third and fourth precisions, and reducing a result of the summation having the increased precision down to the second precision. The data stream inserter 830 is configured to insert the transform coefficient block 122 into a data stream 132.

The apparatus 800 may, for example, be the video encoder 100 according to FIG. 1, without the smoothing filter 162. The reconstructor 850 of the apparatus 800 corresponds to the reconstructor 150 of the video encoder 100, the predictor 860 corresponds to the predictor 160 of the video encoder 100 (with the difference, that the predictor 860 of the apparatus 800 does not necessarily need to have the smoothing filter 162). The residual value determiner 810 corresponds to the residual information determiner 110 of the video encoder 100. The transformer 820, the inverse transformer 840 and the data stream inserter 830 correspond each to its equivalent in the video encoder 100. As explained above, the block 102 to be decoded may be defined in a first precision. A precision may also be called a bit-depth representation, wherein a higher precision corresponds to a higher bit-depth representation. A bit-depth representation of a value may be increased by left-shifting the value with a predetermined number of bits. A left-shift corresponds to a multiplication with 2.

As explained before, an increase in the precision of the reconstructed reference image samples 152 may be obtained by left-shifting each value of these reconstructed reference image samples 152 as it has been explained with the reference vector q to obtain the new reference vector q̂. The predictor 860 may use reconstructed reference image samples 152 with a second precision to determine predicted image samples in the third precision forming the prediction 166 (or the block P for the block 102). The increase in precision from the reconstructed reference image samples 152 in the second precision to the predicted image samples or to the prediction 166 in the third precision may be employed by omitting a binary right-shift determined by filter coefficients of an interpolation filter used in the predictor 860, as it has been described before. An increase of the precision of the reconstructed residual sample value to the inverse transformer 840 may be employed by omitting a binary right-shift, for example, used in an inverse discrete cosine transformation. The increased precision prediction 166 may then in the reconstructor 850 together with increased precision reconstructed residual sample values 142 combined in the reconstructor 850 to determine reconstructed image samples of the block 102 at an increased precision, which afterwards is rounded down to the second precision. These reconstructed image samples of the block 102 may then be used as reconstructed reference image samples 152 for blocks following (in encoding or decoding order) the block 102. As mentioned before, by using an increased precision prediction 166 and an increased precision reconstructed residual information 142 a better reconstructed version of the block may be obtained, than in the case, wherein a prediction with the same precision like the block 102 is defined is used and a residual information with the same prediction like the block 102 is used. Therefore a resulting reconstructed residual information 142 for the block 102 may in embodiments of the present invention be smaller and may therefore be represented by less bit in the data stream 132.

The predictor 860 may be further configured to obtain the predicted image samples (the prediction 166) by using the block 102 to be coded together with the reconstructed reference image samples 152. Furthermore, the predictor 860 may be configured to determine the prediction parameter 169, which may be inserted from the data stream inserter 130 into the data stream 132.

According to some embodiments of the present invention, the apparatus 800 may be configured to reconstruct the block 102 using intra prediction or inter-prediction. In the intra prediction case, the reconstructed reference image samples 152 may contain neighboring image samples, bordering image samples of the block 102. The prediction parameter 169 may for example be an intra prediction parameter, determining a prediction direction, from a set of possible prediction directions, for example like the index mode explained according to FIG. 5. In the inter-prediction case the reconstructed reference image samples 152 may be reconstructed reference image samples from previously encoded pictures. The prediction parameter 169 may for example contain motion information and reference index numbers, determining an inter-motion-prediction for the block 102.

Figure 9:
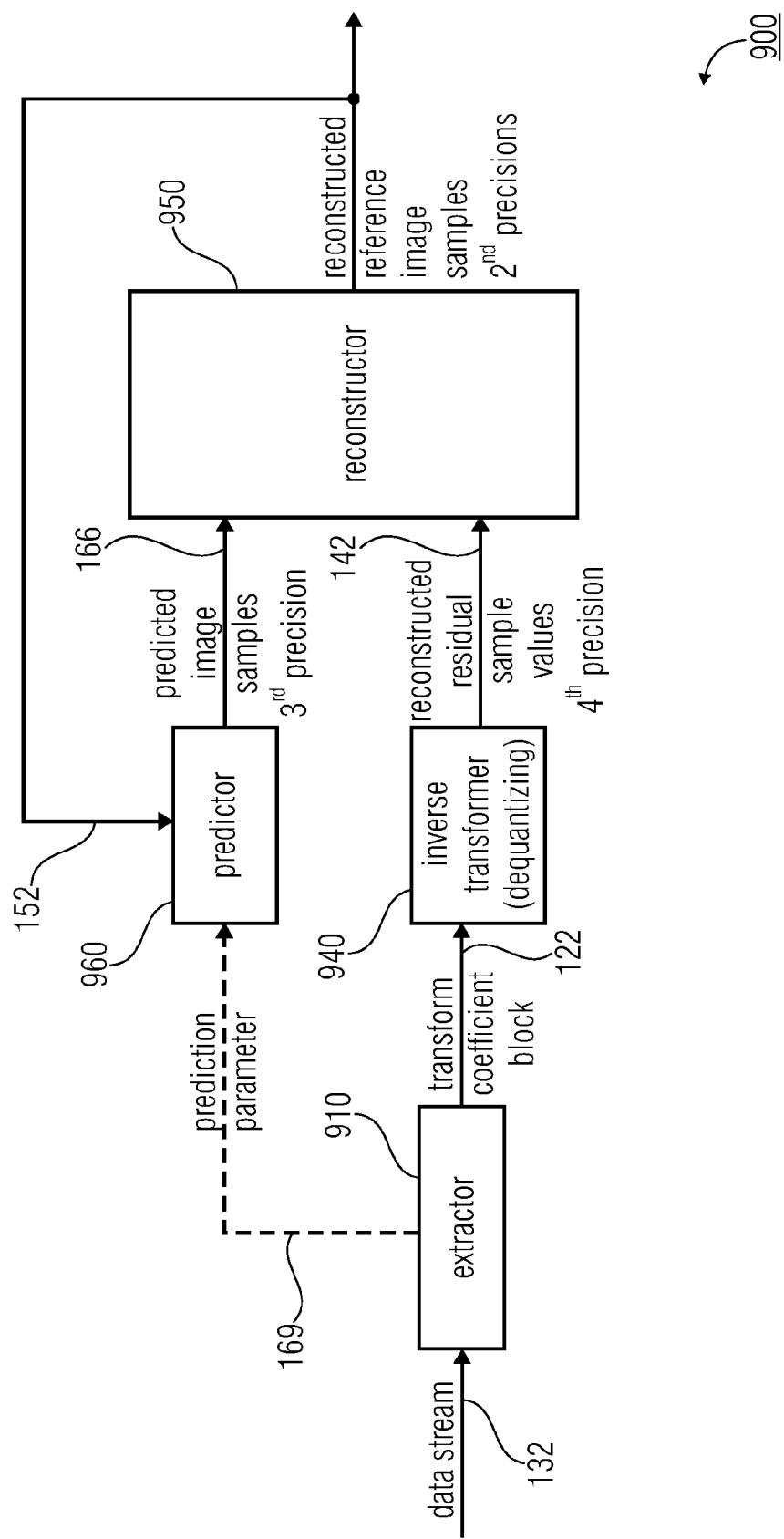
FIG. 9 shows a block diagram of an apparatus according to a further embodiment according to the second aspect of the present invention.

FIG. 9 shows an apparatus 900 according to a further embodiment according to the second aspect of the present invention. The apparatus 900 for reconstructing a block 102 of a picture defined in a first precision by prediction comprises a reconstructor 950, an extractor 910, a predictor 960 and an inverse transformer 940. The reconstructor 950 is configured to reconstruct reference image samples from a data stream 132 at a second precision being equal to or greater than the first precision, in which the block 102 is defined, to obtain reconstructed reference image samples 152 in the second precision. The extractor 910 is configured to extract a transform coefficient block 122 for the block 102 from the data stream 132. The predictor 960 is configured to determine predicted image samples 166 for the block 102 or a prediction 166 for the block 102 from the reconstructed reference image samples 152 at a third precision, which is higher than the second precision. The inverse transformer 940 is configured to apply an inverse spectral decomposition transform (for example an inverse discrete cosine transform) to the transform coefficient block 122 to obtain reconstructed residual sample values 142 for the block 102 at a fourth precision greater than the first precision. The reconstructor 950 is further configured to reconstruct the block 102 by summation of the predicted image samples 166 and the reconstructed residual sample values 142 at an increased precision equal to or greater than at least one of the third and fourth precision, and reducing the result of the summation having the increased precision down to the second precision. The result of the summation may be reconstructed image samples of the block 102, which may be used as reconstructed reference image samples 152 for (for in decoding order) following blocks, which have to be decoded.

The apparatus 900 may correspond to the video decoder 200 according to FIG. 2, with the difference, that the predictor 960 does not necessarily need to comprise a smoothing filter 162. The increase in the precision from the reconstructed reference image samples 152 in the second precision to the predicted image samples 166 in the third precision may, as in the apparatus 800, be employed by bit-shifting the reconstructed reference image samples 152 before determining the predicted image samples 166 within the predictor 960 or by bit-shifting filter coefficients, which may be used in the predictor 960 for interpolating the reconstructed reference image samples 152 to obtain the predicted image samples 166. The precision increase of the reconstructed residual sample values to the fourth precision within the inverse transformer 940 may be performed as described with the video encoder 800 according to FIG. 8, by omitting a bit-shift in the inverse discrete cosine transformation, which may be employed in the inverse transformer 940. The reconstructed reference image samples may be rounded down to the first precision, and then be provided to a display output device, like a display. According to some embodiments, the extractor 910 may be configured to extract a prediction parameter 169 out of the data stream 132. The predictor 160 may be configured to determine the predicted image samples 166 for the block 102 by using the prediction parameter 169 for the block 102 and the reconstructed reference image samples 152.

According to some embodiments of the present invention, the reconstructor 950 may be configured such that the reconstructed reference image samples 152 are neighboring image samples, the neighboring image samples comprising edge neighboring samples bordering the block 102 or image samples of the block 102 to be reconstructed. In other words, the apparatus 900 may be configured to perform an intra prediction.

According to further embodiments of the present invention, the apparatus 900 may also be configured to perform inter-prediction, in this case, the reconstructed reference samples 152 may be image samples of previously decoded pictures, and the prediction parameter 169 may, for example, be a motion information or in general an inter-prediction parameter.

According to some embodiments, as mentioned before, the predictor 960 may be configured such that the prediction values for the predicted image samples 166 for the block 102 are determined by interpolating the reconstructed reference image samples 152. The predictor 960 may be configured to increase the precision of the reconstructed reference image samples 152 before interpolating. As an example, which has been described above, the new reference vector $\hat{q}$, which is used for the interpolation is obtained by increasing the precision (binary left-shifting) the reference vector q.

According to some further embodiments, the predictor 960 may be configured to interpolate the reconstructed reference image samples 152 by using an FIR filter (like the above-mentioned interpolation filter), wherein coefficients of the FIR filter are adapted such that denominators of the coefficients are equal, and wherein the third precision of the predicted image samples is dependent on the denominators of the coefficients. In the above-mentioned examples, filter coefficients of the FIR filters may all be a multiple of ¼, in which the precision of the reconstructed reference image samples 152 is increased by only multiplying with numerators of the coefficients of the FIR filter and by omitting the division (binary right shift) with the denominators (which are 4 for all coefficients) which may be equal to a multiplication with 4 or a binary left-shift by 2.

In the above-mentioned examples, therefore, the third precision is by a number of bits equal to log 2 of the denominator of the coefficients of the FIR filter higher than the second precision.

As mentioned before, the reconstructor 950 may be configured to provide the reconstructed block of the picture to a display output device, for this the apparatus 900 may further comprise a reproduction output, which is configured to provide the reconstructed block of the picture in the first precision.

Figure 10:
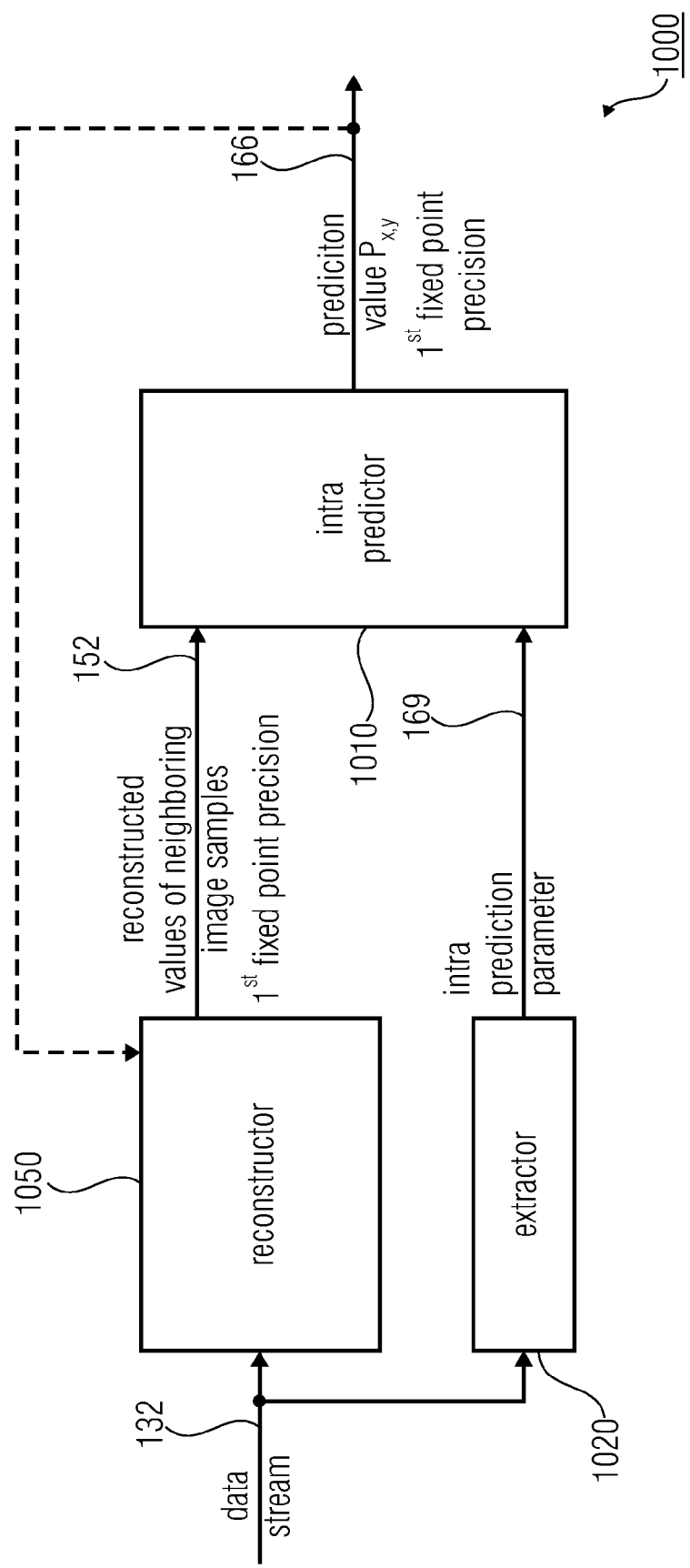
FIG. 10 shows a block diagram of an apparatus according to the third aspect of the present invention.

FIG. 10 shows a block diagram of an apparatus 1000 according to the third aspect of the present invention. The apparatus 1000 for reconstructing a block 102 of a picture by intra prediction comprises a reconstructor 1050, an extractor 1020 and an intra predictor 1010. the reconstructor 1050 is configured to determine reconstructed values 152 of neighboring image samples of the picture, neighboring the block 102 from a data stream 132, in a first fixed point precision. The extractor 1020 is configured to extract an inter-prediction parameter 169 from the data stream 132. The intra predictor 1010 is configured to determine a prediction value $p_{x,y}$ for a pre-determined image sample $o_{x,y}$ of the block 102 from the reconstructed values 152 of the neighboring image samples by performing an interpolation between the reconstructed values 152 of the neighboring image samples at an intersection between a line (a prediction direction line) crossing the predetermined image sample $o_{x,y}$ and extending in a predetermined direction selected from a set of possible directions in dependence of the intra prediction parameter 169, and a line (for example, the top reference ray 310 or the left reference ray 320) along which the reconstructed neighboring image samples 152 serially extend, with, for a subset of that possible directions, provisionally performing the interpolation at a second fixed point precision increased relative to the first fixed point precision by an amount k, depending on the predetermined direction and then rounding the prediction value to the first fixed point precision.

The apparatus 1000 corresponds to the video decoder 200. The reconstructor 1050 of the apparatus 1000 corresponds to the reconstructor 150 of the video decoder 200, with the difference that the reconstructor 1050 may be configured to obtain the reconstructed residual information 142 for the block 102 from the data stream 132. The extractor 1020 corresponds to the extractor 210 of the video decoder 200. The intra predictor 1010 corresponds to the predictor 160' of the video decoder 200. The intra predictor 1010 differs from the predictor 160' in that it does not necessarily need a smoothing filter 162. Although the video decoder 200 according to FIG. 2 may be suited for use in applications using intra prediction and inter-prediction, the apparatus 1000 may be used for performing intra predictions only. Therefore the reconstructed samples 152 of the video decoder 200 correspond to the reconstructed values 152 of neighboring image samples (bordering the block 102) of the apparatus 1000. The prediction parameter 169 of the video decoder 200 corresponds to the intra prediction parameter 169 of the apparatus 1000. The prediction value $p_{x,y}$, determined by the intra predictor 1010 corresponds to the prediction 166 for the block 102 in the video decoder 200, because the prediction 166 for the block 102 comprises a plurality of prediction values $p_{x,y}$ which form the prediction 116.

As it has been seen from the table according to FIG. 5, for different prediction directions, a different increase in precision of the reconstructed reference values or the reconstructed values 152 of neighboring image samples may be useful, because of different interpolation filters, which may be applied to the reconstructed values 152 of neighboring image samples. Therefore, embodiments according to the third aspect of the present invention may increase the bit-depth of the reconstructed values 152 of neighboring image samples based on the prediction direction for the block 102. Referring to the above-described example, the table of FIG. 5 may further comprise a sixth column, which determines by which factor k a precision of the reconstructed values 152 of neighboring image samples have to be increased. This may lead to a reduction in computational load, especially in cases, in which no bit-depth increase is needed (for example, in the cases of index mode 0, 1 and 2).

According to some embodiments of the present invention, the intra predictor 1010 may be configured such that the interpolation is performed using an FIR filter (the above described interpolation filter) wherein a filter tap number of the FIR filter is dependent on the predetermined direction and on a position of the predetermined sample $o_{x,y}$ within the block 102. In other words, as can be seen from FIG. 5, an interpolation filter may be dependent on the prediction direction (the index mode) and on the position of the predetermined sample $o_{x,y}$, for example, if a half pel position needs to be interpolated or a full pel position needs to be interpolated.

Furthermore, the intra predictor 1010 may be configured such that the precision of the coefficients of the FIR filter is increased to the second precision before interpolating.

This been shown, in the case, in where coefficients of the FIR filter are multiplied with a value (in the above-mentioned example with the value 4) before the interpolation is applied to the reconstructed values 152 of the neighboring image samples.

According to further embodiments, the intra predictor 1010 may be configured such that the precision of the reconstructed values 152 of the neighboring image samples is increased to the second fixed point precision before performing the interpolation. This has been explained, in the above-mentioned examples by obtaining the new reference vector $\hat{q}$ from the reference vector q by left-shifting the values of the reference vector q (by left-shifting the reconstructed values 152 of the neighboring image samples).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for reconstructing a block of a picture defined in a first bit-depth precision by prediction, comprising:
   a reconstructor configured to reconstruct reference image samples from a data stream at a second bit-depth precision being equal to or greater than the first bit-depth precision to achieve reconstructed reference image samples;
   an extractor configured to extract a transform coefficient block from the data stream;
   a predictor configured to determine predicted image samples for the block from the reconstructed reference image samples at a third bit-depth precision higher than the second bit-depth precision;
   an inverse transformer configured to apply an inverse spectral decomposition transform to the transform coefficient block to achieve reconstructed residual sample values for the block at a fourth precision greater than the first precision; and
   wherein the reconstructor is further configured to reconstruct the block by summation of the predicted image samples and the reconstructed residual sample values at an increased bit-depth precision equal to or greater than at least one of the third and fourth bit-depth precisions and reducing a result of the summation comprising the increased bit-depth precision down to the second bit-depth precision.

2. The apparatus according to claim 1,
   wherein the reconstructor is further configured such that the reconstructed reference image samples are neighboring image samples, the neighboring image samples comprising edge-neighboring samples bordering the block to be reconstructed.

3. The apparatus according to claim 1,
   wherein the predictor is further configured such that prediction values for the predicted image samples for the block are determined by interpolating the reconstructed reference image samples.

4. The apparatus according to claim 3, wherein the predictor is further configured to increase the bit-depth precision of the reconstructed reference image samples before interpolating.

5. The apparatus according to claim 3, wherein the predictor is further configured to interpolate the reconstructed reference image samples by using a FIR filter; and wherein coefficients of the FIR filter are adapted such that denominators of the coefficients are equal and wherein the third bit-depth precision of the predicted image samples is dependent on the denominators of the coefficients.

6. The apparatus according to claim 5, wherein the predictor is further configured such that the third bit-depth precision is by, a number of bits, equal to log 2 of the denominators of the coefficients higher than the bit-depth second precision.

7. The apparatus according to claim 1, further comprising a reproduction output, the reproduction output configured to provide a reconstruction of the block of the picture in the first bit-depth precision.

8. An apparatus for encoding a block of a picture defined in a first bit-depth precision, comprising:
   a reconstructor configured to reconstruct reference image samples at a second bit-depth precision being equal to or greater than the first bit-depth precision to achieve reconstructed reference image samples;
   a predictor configured to determine predicted image samples for the block from the reconstructed reference image samples at a third bit-depth precision higher than the second bit-depth precision;
   a residual sample value determiner configured to compare the predicted image samples and original image samples of the block of the picture defined in the first bit-depth precision to determine residual sample values for the block;
   a transformer configured to apply a spectral decomposition transform to the achieved residual sample values and use a quantization to achieve a transform coefficient block;
   an inverse transformer configured to apply an inverse spectral decomposition transform to the transform coefficient block to achieve reconstructed residual sample values for the block at a fourth bit-depth precision greater than the first bit-depth precision;

wherein the reconstructor is further configured to achieve reconstructed image samples of the block by summation of the predicted image samples and the reconstructed residual sample values at an increased bit-depth precision equal to or greater than at least one of the third and fourth bit-depth precisions and reducing a result of the summation comprising the increased bit-depth precision down to the second bit-depth precision; and a data stream inserter configured to insert the transform coefficient block into a data stream.

9. A method for reconstructing a block of a picture defined in a first bit-depth precision by prediction, comprising:

reconstructing a reference image sample from a data stream at a second bit-depth precision being equal to or greater than the first bit-depth precision;

extracting a transform coefficient block for the block from the data stream;

determining predicted image samples for the block from the reconstructed reference image samples at a third bit-depth precision higher than the second bit-depth precision;

applying an inverse spectral decomposition transform to the transform coefficient block to achieve reconstructed residual sample values for the block at a fourth bit-depth precision greater than the first bit-depth precision; and reconstructing the block by summation of the predicted image samples and the reconstructed residual sample values at an increased precision equal to or greater than at least one of the third and fourth bit-depth precisions and reducing a result of the summation comprising the increased precision down to the second bit-depth precision.

10. A method for encoding a block of a picture defined in a first bit-depth precision, comprising:

reconstructing reference image samples at a second bit-depth precision being equal or greater than the first bit-depth precision;

determining predicted image samples for the block from the reconstructed reference image samples at a third bit-depth precision higher than the second bit-depth precision;

comparing the predicted image samples and original image samples of the block of the picture defined in the first bit-depth precision to determine residual sample values for the block;

applying a spectral decomposition transform to the achieved residual sample values and using a quantization to achieve a transform coefficient block;

applying an inverse spectral decomposition transform to the transform coefficient block to achieve the reconstructed residual sample values for the block at a fourth bit-depth precision greater than the first precision;

achieving reconstructed image samples of the block by summation of the predicted image samples and the reconstructed residual sample values at an increased precision equal to or greater than at least one of the third and fourth bit-depth precisions and reducing a result of the summation comprising the increased bit-depth precision down to the second bit-depth precision; and inserting the transform coefficient block into a data stream.

11. A non-transitory computer readable digital storage medium having stored thereon a computer program comprising a program code for performing, when running on a computer, a method for reconstructing a block of a picture defined in a first bit-depth precision by prediction, said method comprising:

reconstructing a reference image sample from a data stream at a second bit-depth precision being equal to or greater than the first bit-depth precision;

extracting a transform coefficient block for the block from the data stream;

determining predicted image samples for the block from the reconstructed reference image samples at a third bit-depth precision higher than the second bit-depth precision;

applying an inverse spectral decomposition transform to the transform coefficient block to achieve reconstructed residual sample values for the block at a fourth bit-depth precision greater than the first bit-depth precision; and reconstructing the block by summation of the predicted image samples and the reconstructed residual sample values at an increased bit-depth precision equal to or greater than at least one of the third and fourth bit-depth precisions and reducing a result of the summation comprising the increased bit-depth precision down to the second bit-depth precision.

12. A non-transitory computer readable digital storage medium having stored thereon a computer program comprising a program code for performing, when running on a computer, a method for encoding a block of a picture defined in a first bit-depth precision, said method comprising:

reconstructing reference image samples at a second bit-depth precision being equal or greater than the first bit-depth precision;

determining predicted image samples for the block from the reconstructed reference image samples at a third bit-depth precision higher than the second bit-depth precision;

comparing the predicted image samples and original image samples of the block of the picture defined in the first bit-depth precision to determine residual sample values for the block;

applying a spectral decomposition transform to the achieved residual sample values and using a quantization to achieve a transform coefficient block;

applying an inverse spectral decomposition transform to the transform coefficient block to achieve the reconstructed residual sample values for the block at a fourth bit-depth precision greater than the first bit-depth precision;

achieving reconstructed image samples of the block by summation of the predicted image samples and the reconstructed residual sample values at an increased bit-depth precision equal to or greater than at least one of the third and fourth bit-depth precisions and reducing a result of the summation comprising the increased bit-depth precision down to the second bit-depth precision; and inserting the transform coefficient block into a data stream.

* * * * *